(12) United States Patent
Tang

(10) Patent No.: US 9,495,454 B2
(45) Date of Patent: Nov. 15, 2016

(54) USER APPARATUS, SYSTEM AND METHOD FOR DYNAMICALLY RECLASSIFYING AND RETRIEVING TARGET INFORMATION OBJECT

(76) Inventor: Chih-Pin Tang, New Taipei (TW)

(*) Notice: Subject to any disclaimer, the term of this patent is extended or adjusted under 35 U.S.C. 154(b) by 319 days.

(21) Appl. No.: 13/415,311

(22) Filed: Mar. 8, 2012

(65) Prior Publication Data

US 2013/0238622 A1    Sep. 12, 2013

(51) Int. Cl.
*G06F 17/30*    (2006.01)

(52) U.S. Cl.
CPC ... *G06F 17/30864* (2013.01); *G06F 17/30873* (2013.01); *G06F 17/30997* (2013.01)

(58) Field of Classification Search
None
See application file for complete search history.

(56) References Cited

U.S. PATENT DOCUMENTS

| | | | |
|---|---|---|---|
| 2007/0073708 A1* | 3/2007 | Smith et al. | 707/10 |
| 2008/0244429 A1* | 10/2008 | Stading | 715/764 |
| 2010/0010989 A1* | 1/2010 | Li et al. | 707/5 |
| 2012/0047134 A1* | 2/2012 | Hansson et al. | 707/731 |
| 2012/0124071 A1* | 5/2012 | Gebhard | G06F 17/3097 707/767 |

OTHER PUBLICATIONS

Azmeh et al., WSPAB: A Tool for Automatic Classification & Selection of Web Services Using Format Concept Analysis, Sixth European Conference on Web Services, Nov. 12-14, 2008, retrieved on Oct. 14, 2013, retrieved from the Internet <URL: http://ieeexplore.ieee.org/xpls/abs_all.jsp?arnumber=4711647&tag=1>.*
Gao et al., IPAL at ImageClef 2007 Mixing Features, Models and Knowledge, 2007, retrieved on Oct. 15, 2013, retrieved from the Internet <URL: http://citeseerx.ist.psu.edu/viewdoc/download-?doi=10.1.1.108.51&rep=rep1&type=pdf>.*

* cited by examiner

*Primary Examiner* — Tyler Torgrimson
(74) *Attorney, Agent, or Firm* — Muncy, Geissler, Olds & Lowe, P.C.

(57) ABSTRACT

A system, method and user apparatus dynamically reclassify and retrieve target information object(s) among multiple information objects stored on a memory. Multiple attribute classifiers are corresponsive to the information objects. Displayable dynamical reclassifying hints (DRHs) are provided according to user input signal(s). When a first attribute classifier is determined by a central processing unit according to the user input signal, second attribute classifier(s) is determined and combined with one of the attribute classifiers together visibly on a display unit; wherein the second attribute classifier and the combined one of attribute classifier corresponds to same one(s) of the information objects. The DRH(s) combines the attribute classifiers with the same search results together, so as to eliminate possible repeated steps or processes that lead to the same search result(s), and also to reduce the remained selectable attribute classifiers and the following steps to retrieve the target information objects.

30 Claims, 13 Drawing Sheets

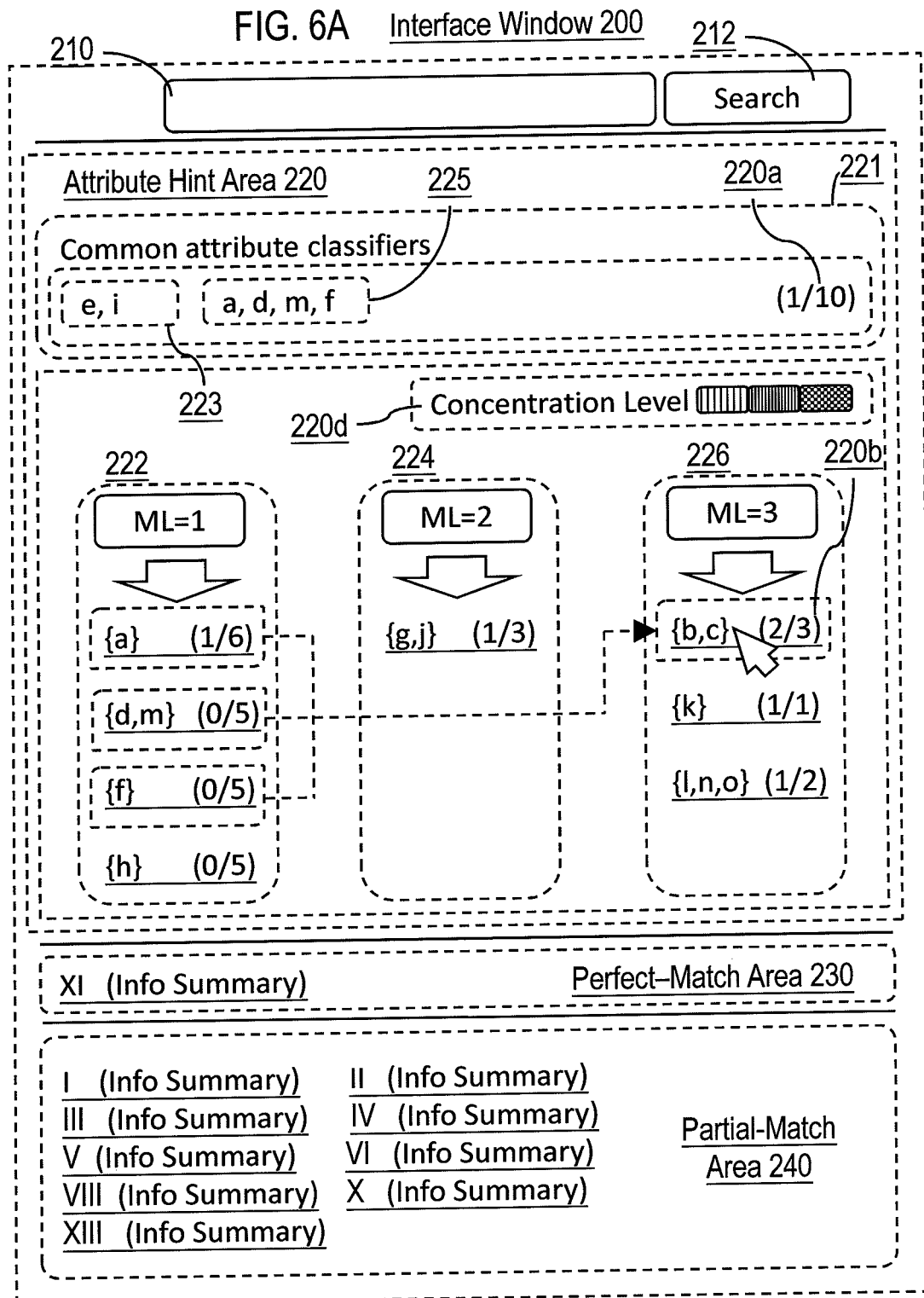

USER APPARATUS, SYSTEM AND METHOD FOR DYNAMICALLY RECLASSIFYING AND RETRIEVING TARGET INFORMATION OBJECT

BACKGROUND

1. Technical Field

The disclosure relates to information processing technology and in particular to a user apparatus, system and method for dynamically reclassifying and retrieving one or more target information object among multiple information objects.

2. Related Art

Nowadays, "information classifiers" such as tags and bookmarks along with "tree structures" are frequently used to classify "digital information objects" (such as webpages, documents with various digital formats) for easy retrieval afterwards. To search for a target information object through an online or offline search engine, "keywords" (also known as metadata, metatags, labels, descriptive terms or attributes) are important factors that determine how accurate the search results would be. Selecting possible ones from a provided group of information classifiers is another way to find the target information object.

As used in various shopping websites, merchandise presented on webpages are usually classified and provided in a format of tree structure, or called "tree menu". A general method to classify various merchandise relates to the use of "metadata", which are basic data or keywords, metatags, labels, descriptive terms and attributes of each of the merchandise. When a user uses a keyword for searching a desired good on a shopping website, aside from a long list of possible results, generally the search results may be provided through several top-layer classifiers, each accompanying with lower-layer classifiers integrated in a multi-level tree menu structures; here the classifiers may be major metadata of the goods provided along with the search results. However, since lower-layer classifiers are hidden under different layers of tree menus, the user needs to search the desired good by switching between different layers of these tree menus, which is very inefficient.

A relevant technology applied with "elastic list principle" is used to browse multi-facetted data structures. First of all, a certain group of digital information objects are classified and divided according to several selected parallel parent classifications in advance. Then dedicated attributes may be assigned respectively to each digital information object that is classified under each of the parent classifications. Usually the demonstration of an elastic list includes visulizing relative proportions or characteristicness of metadata by size or brightness, as well as animated filtering transitions. Therefore, the elastic list principle actually forms a rigid tree menu with dynamical visulization. In such elastic list principle, the selected attribute is fixed together with its parent classification. Namely, when more than one attributes of different parent classifications are selected, these selected parent classifications and attributes are all fixed at the same time as filters applied to the whole group of digital information objects. The presented results are certainly reduced, yet might be lack of accuracy, since very poor crosslinks are built between the attributes that across different parent classifications. Furthermore, these parellel parent classifications are fixed and dedicated to certain topics. When a new information object does not related to the existed parallel patent classifications, no parent classification is suitable to be used to classify the new information object. Both the possible search approaches and efficiency are limited in such elastic list.

Another technology removes the tree structure and instead, only multiple tags are assigned to each of digital information objects. When a first tag is selected, a certain group of digital information objects is determined. The other tags assigned in these selected digital information objects are visually provided for the user to select a second tag for reducing the selected results and simplifying the sequent searching processes. In short, the conventional tagging method provides flexible choices for the user to search desired information objects without the limitations of tree menus. Usually the user would intendedly assign more tags on a signal information object, which means more connections are generated to facilitate the search tasks in the future. For those information objects with lesser tags, the opportunity of being searched is lower; to avoid such problem, the user would further assign more tags. Gradually, accompanying with the increasing of information objects and their tags, the competitions between tags become serious and the problem of too many tags choices starts to bother the search tasks of the user. Namely, if the amounts of both the digital information objects and the remaining tags are too high, and consequently a large number of search attempts through different tag rankings and combinations are inevitable, such tag-oriented retrieving technology is not efficient enough.

In short, current data structures for classifying digital information object, such as tree structure and tag-oriented structure, respectively have their advantages and limitations.

Formal Concept Analysis (FCA) is one of available basic algorithms, which is capable of providing some solutions to achieve the functions introduced above. Generally FCA provides a mathematical notion of concepts and concept hierarchies based on "order" (generally expressed by a mathematical symbol "$\leq$") and "lattice" theory. The basis of FCA has simple data structures, which is called "formal context". Formal context describes binary relationships between a set of information objects and a set of attributes to provide knowledge representation; wherein the attributes are similar to tag or metadata of the set of information objects, as mentioned above. Formal context is defined by $K=(G, M, I)$; where G and M are two independent sets, and I is a relation between G and M.

Table 1 below is an exemplary formal context expressed in the form of an array table. The crosses (namely the relation I between G and M) in the array of Table 1 marked between the set of information objects G (Ga, Gb, Gc, Gd, Ge, Gf, Gg, Gh) and the set of attributes M (M1, M2, M3, M4, M5, M6, M7, M8, M9) is used to describe the relation I between G and M. FIG. 1 is an explanatory diagram of a concept lattice constructed from the formal context of Table 1. Each of the small circles illustrated in FIG. 1 is called a "concept node"; every concept node includes corresponding information object(s) G and attribute(s) M. However, empty set G or M is possible to occur at the top or bottom concept node respectively. The connecting links between the concept nodes show "super-concept" or "sub-concept" relations between any two neighboring concept nodes.

TABLE 1

|    | Ga | Gb | Gc | Gd | Ge | Gf | Gg | Gh |
|----|----|----|----|----|----|----|----|----|
| M1 | X  | X  | X  | X  | X  | X  | X  | X  |
| M2 | X  | X  | X  |    | X  | X  |    |    |
| M3 |    |    | X  | X  |    | X  | X  | X  |

TABLE 1-continued

| | Ga | Gb | Gc | Gd | Ge | Gf | Gg | Gh |
|---|---|---|---|---|---|---|---|---|
| M4 | | | | | X | X | X | X |
| M5 | | | | | | X | | |
| M6 | | | | | X | X | | X |
| M7 | X | X | X | X | | | | |
| M8 | | X | X | X | | | | |
| M9 | | | | X | | | | |

Several derivation operators are introduced as follows. For a subset O∈G (the symbol ∈ means "is a subset of") of the information objects we define the set of attributes common to the objects in O as O':={m∈M|gIm for all g∈O}, where ":=" is a symbol means "is defined as".

For a subset A⊆M of the attributes we define a set of objects which have all attributes in A as A':={g∈G|gIm for all m∈A}.

Given a formal context (G, M, I), a pair (O, A) with O⊆G and A⊆M is a formal concept whenever we find that O=A' and A=O'. O is called the extent and A is called the intent.

The set of formal concepts becomes a partially ordered set (poset) with the ordering relation:

(A1, B1)≤(A2, B2), namely A1⊆A2 and B2⊆B1

A hierarchical order exists between two formal concepts (A1, B1) and (A2, B2). (A1, B1) is called the sub-concept of (A2, B2) and (A2, B2) is called the super-concept of (A1, B1), provided no concept exists between (A1, B1) and (A2, B2). The relation between subconcept and superconcept is called the "hierarchical order" of concepts. The entire set of all formal concepts of (G, M, I) is ordered by the hierarchical order relations and then forming a complete lattice (B(G, M, I), ≤) called "concept lattice". (B(G, M, I), ≤) is a complete lattice, called the concept lattice of the context (G, M, I), and is denoted by B(G, M, I).

In short, FCA provides an organized data structure for the tag-oriented structure mentioned above. However, the utilization of a general FCA does not contribute to an efficient solution for information classification and retrieval technology, since a high amount of search results still has to be presented to the user, and also the meanings of FCA lattice concepts drawings are very difficult to be understood by the users, even provide hints to the users. Even if the formal context is reduced, the remained search results are still possibly too complex and too many to be presented to the user in an organized way.

SUMMARY

Accordingly, in an embodiment of the disclosure, a system is provided for dynamically reclassifying and retrieving one or more target information object among information objects. The system mainly includes a memory and a central processing unit. The memory stores the information objects and multiple attribute classifiers corresponding to the information objects. The central processing unit is in signal connection with the memory. After the central processing unit receives a determined first attribute classifier, the central processing unit determines multiple first information objects and multiple remained attribute classifiers; the first information objects correspond to the determined first attribute classifier and each of the remained attribute classifiers corresponds to one or more of the first information objects. The remained attribute classifiers are visibly displayable through the system as at least a part of a search result. And two or more of the remained attribute classifiers are combinable as a hint (a Dynamical Reclassifying Hint, DRH) when the combinable remained attribute classifiers correspond to the same one or more of the first information objects.

In another embodiment, a method is provided for dynamically reclassifying and retrieving a target information object among information objects stored on a memory. Multiple attribute classifiers correspond to the information objects. After the central processing unit receives a determined first attribute classifier, a central processing unit determines multiple first information objects and multiple remained attribute classifiers; the first information objects correspond to the determined first attribute classifier and each of the remained attribute classifiers corresponds to one or more of the first information objects. The remained attribute classifiers are visibly displayable through the system as at least a part of a search result. And two or more of the remained attribute classifiers are combinable as a hint (a Dynamical Reclassifying Hint, DRH) when the combinable remained attribute classifiers correspond to the same one or more of the first information objects In another embodiment, a user apparatus is provided for dynamically reclassifying and retrieving one or more target information object among information objects accessible through a system. The system is in signal connection with the user apparatus and is accessible to multiple attribute classifiers that correspond to the information objects. The user apparatus includes an input device, a processor and a display unit. The input device generates signals according to a user operation. The processor is in signal connection with the input device, and outputs the signals according to the user operation to the system and receives a determined first attribute classifier from the system. The display unit is in signal connection with the processor, and displays the determined first attribute classifier. According to the determined first attribute classifier, multiple first information objects corresponding to the determined first attribute classifier and multiple remained attribute classifiers each corresponding to one or more of the first information objects are determined. The remained attribute classifiers are visibly displayable through the system as at least a part of a search result. And two or more of the remained attribute classifiers are combinable as a hint (a Dynamical Reclassifying Hint, DRH) when the combinable remained attribute classifiers correspond to the same one or more of the first information objects

BRIEF DESCRIPTION OF THE DRAWINGS

The disclosure will become more fully understood from the detailed description given herein below for illustration only, and thus not limitative of the disclosure, wherein:

FIG. 6A is an explanatory diagram of at least a portion in an interface window displayed on a display unit according to another embodiment;

DETAILED DESCRIPTION

In the following embodiments, a system and method of dynamically reclassifying information objects and retrieving target information object(s) are disclosed. Attribute classifiers are inherent in or assigned to the corresponding information objects. Based on enhanced technology regarding Formal Concept Analysis, dynamical reclassifying hint(s) (DRHs) are dynamically provided to a user, based on the search inquiry input by the user to a computer system or electronic device. In some embodiments, unlike the traditional "tagged" information, the DRH(s) combined the attribute classifiers (or tags) with the same search results together, so as to eliminate possible repeated steps or processes that lead to the same search result(s), and also to reduce the remained selectable attribute classifiers and the following steps to retrieve the target information objects. In some embodiments, DRHs(s) also indicates the correlated attribute classifiers corresponding to the first attribute classifier determined by a user input signal, which is generated by a search inquiry, a selected attribute classifier or by moving a cursor onto certain attribute classifier(s) on a screen or display unit. Since the system and method still maintain the characteristics of tags for the attribute classifiers, no matter which attribute classifier is selected or determined as the first attribute classifier, DRH(s) is able to be provided dynamically and aimed to different first attribute classifier determined by various search inquiries or user operations. In some embodiments, the system and method visibly combine or indicate certain attribute classifiers as DRH(s) according to the first or first several attribute classifiers determined by the user input signal, thereby facilitating faster and more accurate search result(s). The corresponding information objects may be displayed jointly with the DRH and the indicated attribute classifiers in an interface window on a display unit.

Figure 1:
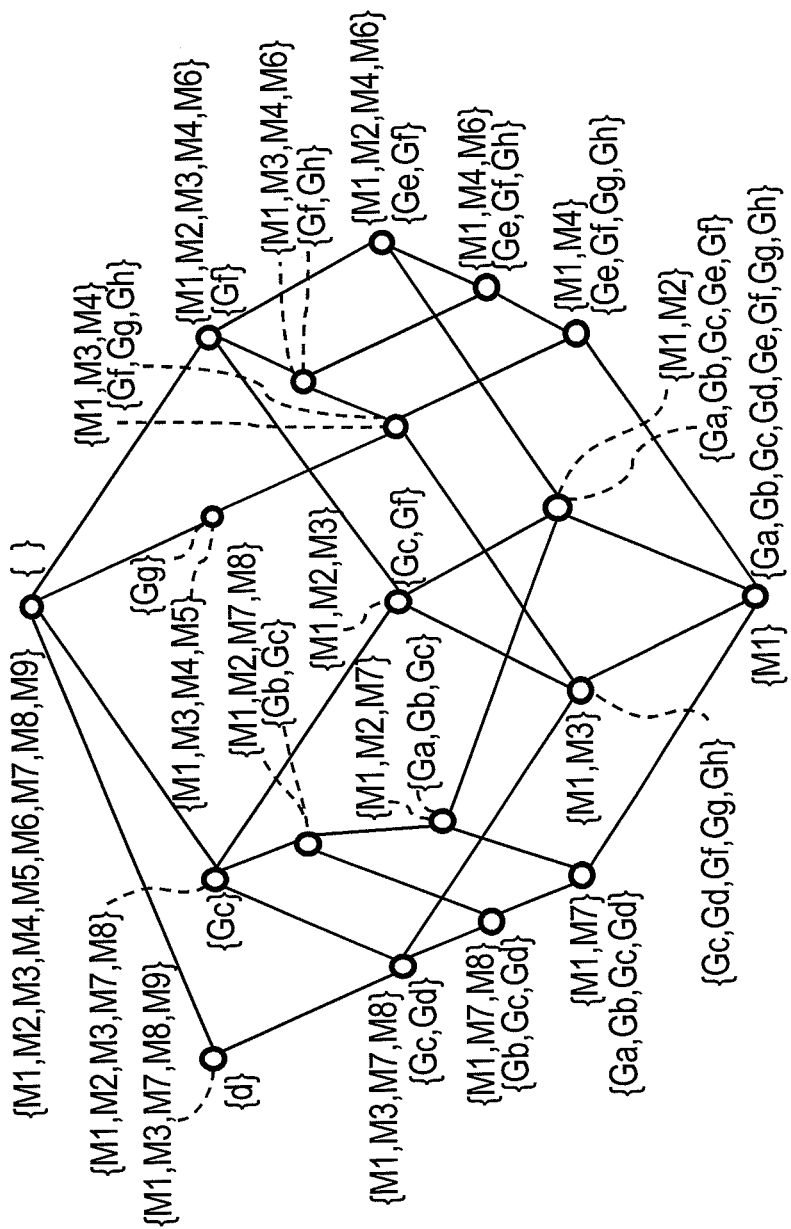
FIG. 1 is an explanatory diagram of a concept lattice constructed from the formal context of Table 1.
Figure 2:
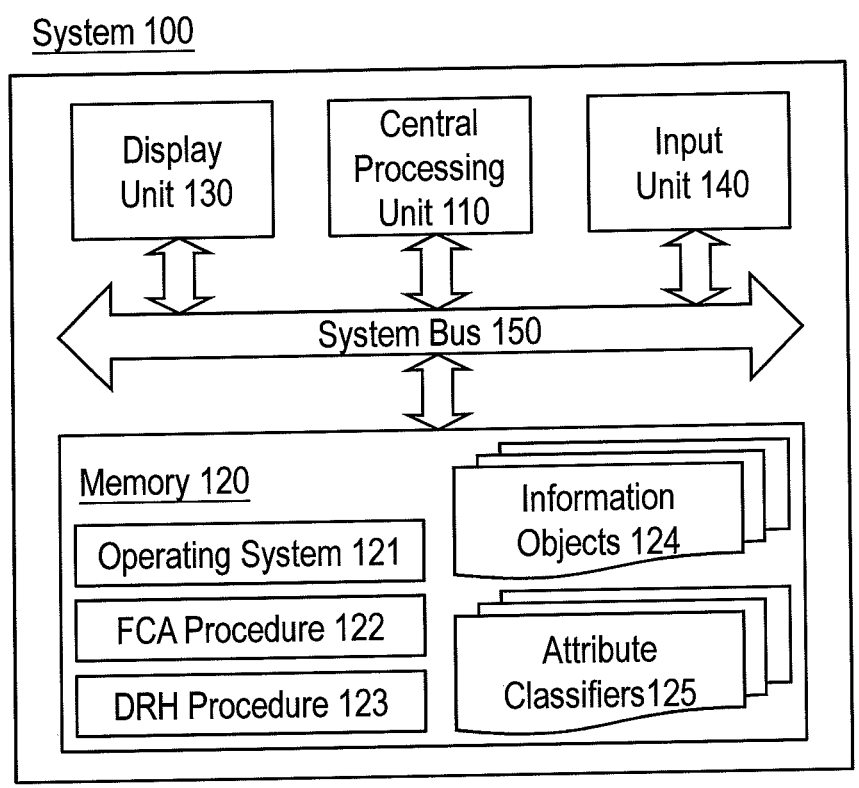
FIG. 2 is a block diagram of a system for dynamically reclassifying and retrieving target information object according to an embodiment.

Please refer to FIG. 2, which is a block diagram of a system for dynamically reclassifying and retrieving target information object according to an embodiment of the disclosure. System 100 includes a central processing unit 110, a memory 120, a display unit 130, an input unit 140 and system buses 150. System 100 is an integrated computing system for processing digital information and data (especially digital information objects in the disclosure) according user inputs (signals generated according to user operations). In some embodiments, system 100 may be realized by personal computer, notebook computer, tablet computer, personal digital assistant, smart phone, workstation, server and etc.

Central processing unit 110 is operable to perform basic arithmetical, logical, and input/output operations of system 100. In some embodiments, central processing unit 110 may be realized by an integrated circuit, also known as IC or chip.

Memory 120 is basically a storage device in signal connection with central processing unit, operable to store digital information/data and computer programs. In some embodiments, memory 120 may include or be realized by volatile or non-volatile computer memories. Examples of volatile computer memory include random access memory (RAM), dynamic random access memory (DRAM), static random access memory (SRAM), solid-state disk (SSD) and etc. Examples of non-volatile computer memory include read-only memory (ROM), flash memory, ferroelectric RAM, most types of magnetic computer storage devices (e.g. hard disks, floppy disks, and magnetic tape), optical discs and etc. In some embodiments, memory 120 is operable as a system memory dedicated for central processing unit 110 to perform computing tasks, or operable as a internal or external, local or online (on any private/public networks or the internet) storage device accessible by system 100. The term "in signal connection" in the disclosure means to connect via electrical signals transmitted through electrical wires or cables, card interface and slots, traces or buses on one or more printed circuit board, network cables for private networks or the internet, and wireless protocols based on any type of wireless communication standards, and any combination thereof.

In FIG. 2, memory 120 has an operation system 121, a FCA (Formal Concept Analysis) procedure 122, a Dynamical Reclassifying Hint (DRH) procedure 123, multiple information objects 124 and multiple attribute classifiers 125 installed and/or stored therein.

Operating system 121 is a set of computer programs that manages computer hardware resources, and provides common services for application software procedures, such as Microsoft Windows XP/2000/Vista/7/8 on x86 32/64 bit computers, or Android, iOS, Linux, Mac OS X operable on computers or mobile devices.

FCA procedure 122 is a set of computing processes based on Formal Concept Analysis, operable and performable by central processing unit 110 and memory 120 to establish one or more formal context and/or concept lattice according to attribute classifiers 125 of all the involved information objects 124. The definitions of formal context and concept lattice are defined as well-known in the fields of FCA data processing technology. Generally a concept lattice is a visible set structure formed by concept nodes and in-between connections, and is generated according to a formal context. In some embodiments, a formal context of system 100 is a relation structure established through Formal Concept Analysis and constructed between certain information objects 124 and the corresponding attribute classifiers 125 of the information objects 124. Such formal context for example includes the information objects, the corresponding attribute classifiers and the relations between the information objects and the corresponding attribute classifiers. In some embodiments, a concept lattice includes multiple concept nodes with concept connections in between; each of the concept nodes includes information of a partial set of the aforesaid information objects and a partial set of the corresponding attribute classifiers. Some concept nodes may include empty set of information objects or attribute classifiers. A concept lattice may be illustrated by drawings, such as FIG. 4A. In certain circumstances, a concept lattice may be considered as a visible formal context; a formal context may be computer readable and storable in the format of a concept lattice or a matrix table with information objects, attribute classifiers and the relations in between.

In some embodiments, FCA procedure 122 may be installed in the system 100 as different digital formats performable by central processing unit 110. For example, FCA procedure 122 may be installed as a computer application program under environments of operation system 121, or be stored and performed dedicatedly as a firmware program on an integrated circuit, a chip or a microprocessor.

DRH procedure 123 is a set of computing processes regarding to Formal Concept Analysis, integrated with or independent from FCA procedure 122, operable and performable by central processing unit 110 and memory 120, to reclassify information objects 124 included in one or more formal context or concept lattice, and facilitates an enhanced retrieval process and user interfacing processes for one or more target information object 124 according to the inquiry input by the user; wherein the formal context or concept lattice is established by FCA procedure 122, as mentioned above. Most importantly, DRH procedure 123 reclassifies information objects 124 and provides dynamic, reclassifying, interactive hints on display unit 130 for the user. In some embodiments, DRH procedure 123 may have different digital formats operable and performable by central processing unit 110 and memory 120. For example, DRH procedure 123 may be installed as a computer application program and operable under environments of operation system 121; or DRH procedure 123 may be stored and dedicatedly performed as a firmware program on an integrated circuit, a chip or a microprocessor. DRH procedure 123 is further described in FIG. 3A and the relevant descriptions in the following sections. In an embodiment, DRH procedure 123 includes displaying a search column or a list of the attribute classifiers 125 of information objects 124 on display unit 130 for a user to input or select search keywords/classifiers through input unit 140. In another embodiment, DRH procedure 123 may include matching the search keywords/classifiers to the attribute classifiers 125 of each of information objects 124, and then generating a modified search result list and displaying on display device 130. In some embodiments, DRH procedure 123 may include certain FCA related processes to perform certain FCA related functions.

In some embodiments, each of information objects 124 is information in one of various digital formats and operable/performable to be stored in electronic devices. Examples for information objects 124 may be digital text files, digital music files, digital video files, digital picture/photo/image files, digital address book, digital tags/bookmarks/folders (such as "My Favorites" performed in Microsoft Windows operating system), shortcuts for computer programs and etc. Furthermore, aside from digital files, any information section included within a digital file and displayable on electronic devices is possible to be defined as an information object 124. For example, emails and the contents, contacts, classifications of contacts, tasks or to-do lists included in the emails, or even all the information managed and processed in an email processing application program may be defined as information objects 124. In another example, any information accessible on a website, such as FACEBOOK.COM, may be defined as information objects. Each of information objects 124 includes one or more attribute classifiers 125 naturally inherent therein (such as digital file format/type, file name or even keywords in a text document) or externally assigned (for example: the attribute classifiers "Family", "Birthday", "Hometown" assigned as tags to a digital image file). In another embodiment, information objects 124 may include any types of digital files operable/performable/storable in electronic devices. In an embodiment, attribute classifier 125 may be selected by the group consisting of metadata, basic data, keywords, metatags, labels, descriptive terms and attributes and any combination regarding to an information object 124 thereof. In another embodiment, aside from text type attribute classifiers, digital audio files, certain digital colors (displayable on the screen of an electronic device), digital pictures/photos/images/videos may also be defined as attribute classifier 125. Namely, for example, the user is able to "tag" a photo with a reference image; such reference image is defined and operated as an attribute classifier.

Display unit 130 is an electronic output device in signal connection with central processing unit 110, operable for presentation of information in visual form (such as computer monitors) or tactile form (used for example in tactile electronic displays for blind people). In some embodiments, display unit 130 may be realized by computer monitor based on CRT, LCD (Liquid Crystal Display), OLED (Organic Light-Emitting Diode) or any other panel technologies.

Input unit 140 is a peripheral (piece of computer hardware equipment) in signal connection with central processing unit 110, operable as a user interface for the user to input and provide data and control signals to system 100. In some embodiments, input unit 140 may be realized by keyboards, pointing devices (such as computer mouse and trackball), touch screens and/or light pens.

System buses 150 is electrical wires operable to electrically connect between central processing unit 110, memory 120, display device 130 and input unit 140 for providing electrical signal connection. In some embodiments, system buses 150 may be realized by different forms of electrical wires such as electrical traces on a printed circuit board or connecting cables, operable to connect electrical components in the system 100 and transmit signals between computer hardware components.

Generally, the information objects 124 stored in memory 120 of system 100 in FIG. 2 may be selected to establish the formal context. Such formal context may be stored, for example, in memory 120. System 100 performs FCA procedure 122 (based on FCA) by central processing unit 110 to establish the formal context according multiple information objects 124, the corresponding attribute classifiers 125 of each of information objects 124 and their in-between relations. Attribute classifiers 125 may be assigned to the information objects 124 in advance by the administrator or user of system 100; in some embodiments, attribute classifiers 125 may be naturally inherent within information objects 124.

Figure 4A:
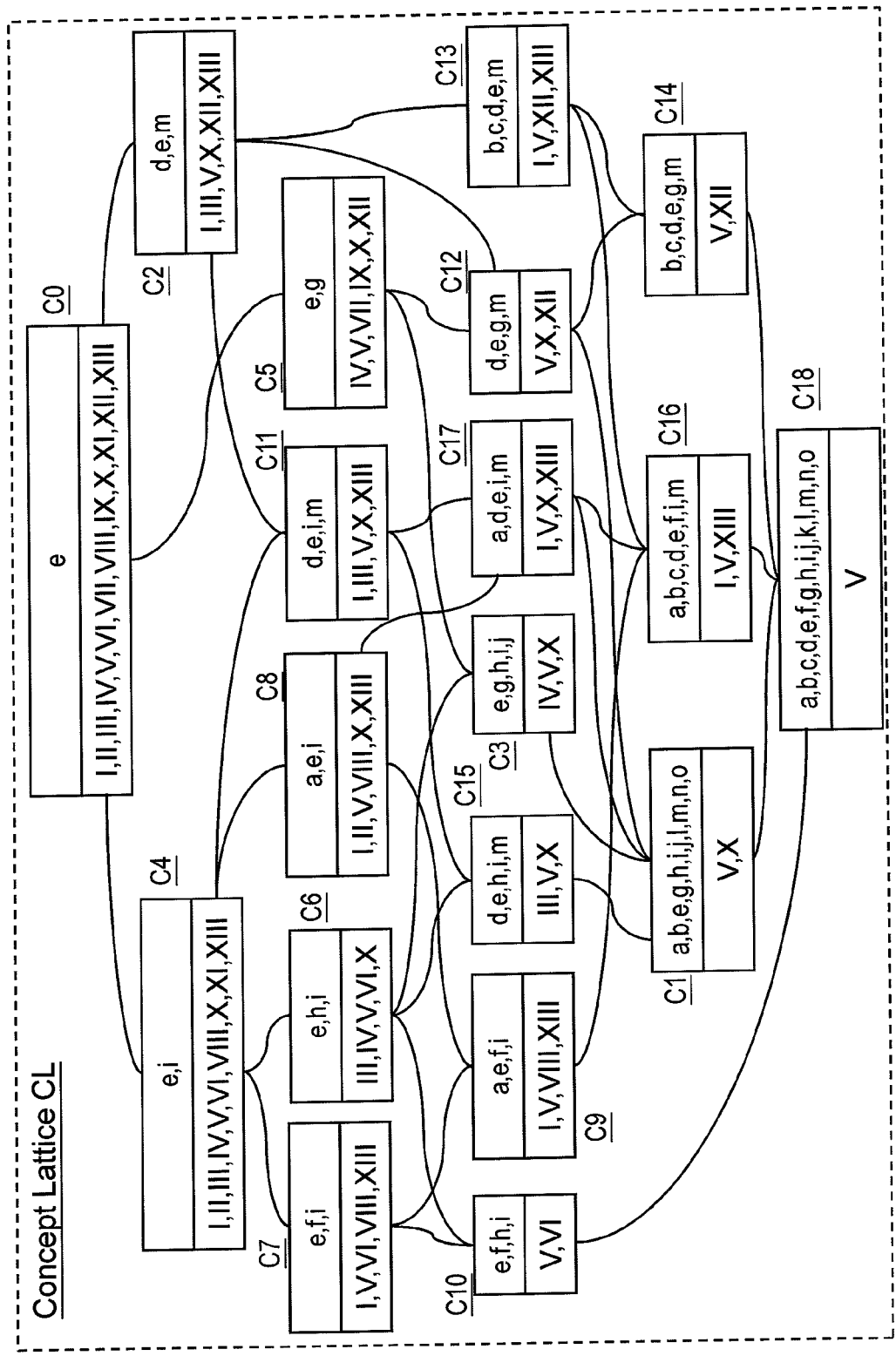
FIG. 4A is an explanatory diagram of a concept lattice constructed according to the formal context shown in Table 2.

In an embodiment, as shown in Table 2, 13 (thirteen) information objects O (I, II, III, IV, V, VI, VII, VIII, IX, X, XI, XII, XIII) are classified by 15 (fifteen) attribute classifiers A (a, b, c, d, e, f, g, h, i, j, k, l, m, n, o), all stored in memory 120 of system 100. Through FCA procedure 122, an example formal context is established and expressed in the form of an array table as shown in Table 2. The Star ("*") symbols used in Table 2 indicate the relationship R between attribute classifiers M and information objects G. In this case, the formal context may be defined by a set of {O, A, R}; where O and A are two independent sets, and R includes relations between O and A. Such formal context may be instantly computed or computed in advance via FCA procedure 122; in either way, the formal context may be stored in memory 120 in digital forms. For easy explanations, the formal context of Table 2 is further expressed as an explanatory diagram of a concept lattice, as shown in FIG. 4A.

According to Table 2, it is easy to understand which attribute classifier A and how many attribute classifiers A are used to classify every information object. As to information object "I", 8 (eight) attribute classifiers (a, b, c, d, e, f, i, m) are used for classifying information object "I". For information object "V", all 15 (fifteen) attribute classifiers (a, b, c, d, e, f, g, h, i, j, k, l, m, n, o) are used to classify information object "V". Since such FCA-based formal context includes principles of super-concept and sub-concept, it is also easy to understand the relations between the concept nodes shown in FIG. 4A.

TABLE 2

|      | a | b | c | d | e | f | g | h | i | j | k | l | m | n | o |
|------|---|---|---|---|---|---|---|---|---|---|---|---|---|---|---|
| I    | * | * | * | * | * | * |   |   | * |   |   |   | * |   |   |
| II   | * |   |   |   | * |   |   |   | * |   |   |   |   |   |   |
| III  |   |   | * | * |   |   | * | * |   |   |   | * |   |   |   |
| IV   |   |   |   |   | * |   | * | * | * |   |   |   |   |   |   |
| V    | * | * | * | * | * | * | * | * | * | * | * | * | * | * | * |
| VI   |   |   |   |   | * | * |   |   | * | * |   |   |   |   |   |
| VII  |   |   |   |   | * | * |   |   |   |   |   |   |   |   |   |
| VIII | * |   |   |   | * | * |   |   | * |   |   |   |   |   |   |
| IX   |   |   |   |   | * | * |   |   |   |   |   |   |   |   |   |
| X    | * |   |   | * | * |   | * | * | * | * |   | * | * | * | * |
| XI   |   |   |   |   | * |   | * |   |   |   |   |   |   |   |   |
| XII  |   | * | * | * | * |   | * |   |   |   |   | * |   |   |   |
| XIII | * | * | * | * | * | * |   |   | * |   |   | * |   |   |   |

Referring to FIG. 4A, concept lattice CL includes 19 (nineteen) concept nodes C0, C1, C2, C3, C4, C5, C6, C7, C8, C9, C10, C11, C12, C13, C14, C15, C16, C17 and C18. A concept lattice is a structured formal context based on FCA. Generally, a concept node is an integrated set including a set of information objects, a set of attribute classifiers and the relations (the connecting lines) with adjacent concept nodes. In other words, the concept lattice of the formal context is based on Formal Concept Analysis and includes the information objects and the corresponding attribute classifiers to form multiple concept nodes. These concept nodes are arranged according to the included attribute classifiers and information objects, as well as the amounts of the attribute classifiers and information objects included in each concept node. In FIG. 4A, the concept nodes with more attribute classifiers are arranged at lower positions; on the contrary, the concept nodes with more information objects are arranged at higher positions.

The in-between connecting lines (or called "concept connections") indicate the relations between the connected concepts. For example, concept node C4 is connected with lower concept nodes C7, C6, C8 and C11. In view of the included information objects, concept node C4 is a superset concept to lower concept nodes C7, C6, C8 and C11. On the other hand, in view of the included information objects, each of lower concept nodes C7, C6, C8 and C11 is a subset concept of concept node C4. Namely, under the principles of superset concept and subset concept, the information objects included in each of the lower concept nodes C7 (attribute classifiers: I,V,VI,VIII,XIII), C6 (attribute classifiers: III,IV,V,VI,X), C8 (attribute: classifiers I,II,V,VIII,X,XIII) and C11 (attribute classifiers: I,III,V,X,XIII) must be all included in the information objects involved within concept node C4 (attribute classifiers I,II,III,IV,V,VI,VIII,X,XI,XIII). In FIG. 4A, all the subset concept nodes under concept node C4 include concept nodes C7, C6, C8, C11, C10, C9, C15, C3, C17, C1, C16 and C18.

Such concept nodes and those in-between concept connections are established according to principles of Formal Concept Analysis and in the disclosure, are selectively processed by FCA procedure 122. For the system administrator or user of system 100, the concept lattice CL may be generated and displayed within an administration interface (not shown) on display unit 130 by performing FCA procedure 122, or just simply computed by FCA procedure 122 without any visible output.

Comparing to the concept lattice CL shown in FIG. 4A, a related concept lattice called "attribute-reduced concept lattice (ARCL)" is important to the embodiments below. In ARCL, a more compact form of labeling may be introduced by using "Attribute Concepts". For example, (m', m") is the attribute concept of an attribute m∈M; wherein m' means the attribute extent {g∈G|gIm} of m. The attribute concept of m, denoted μ(m):=({m}', {m}"), is the largest/top concept with m in its intent. {m}' means the related information objects corresponding to attribute classifier m, and {m}" means the related attribute classifiers corresponding to {m}'. In short, an attribute concept for a certain attribute classifier includes (1) the related information objects corresponding to the certain attribute classifier and (2) the related attribute classifiers corresponding to the related information objects that correspond to the certain attribute classifier.

Figure 4B:
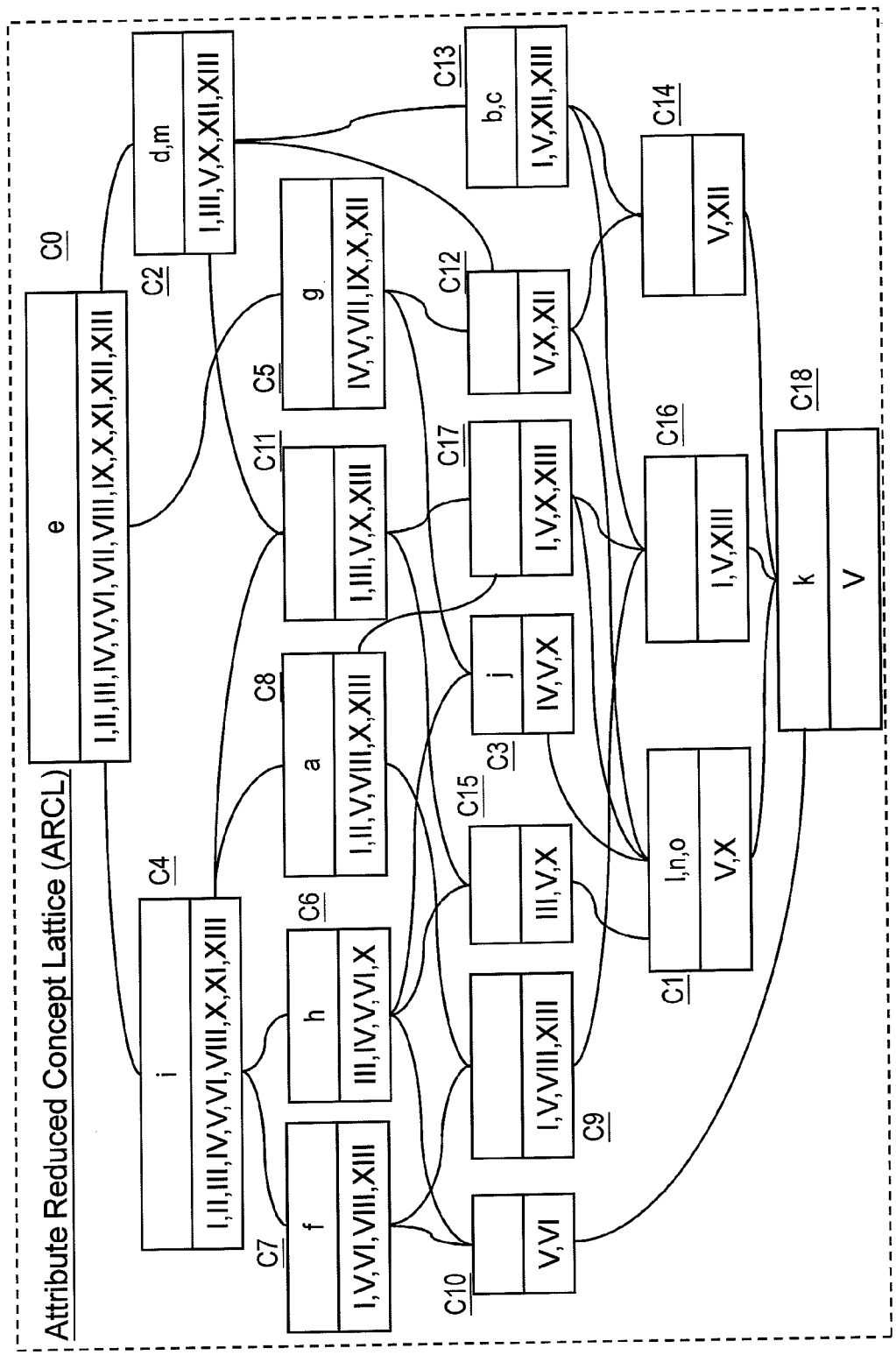
FIG. 4B is an explanatory diagram of an Attribute-Reduced Concept Lattice ARCL constructed according to the concept lattice in FIG. 4A and the formal context shown in Table 2.

Namely in FIG. 4A, the largest/top concept nodes for each of the attribute classifiers (a, b, c, d, e, f, g, h, i, j, k, l, m, n, o) need to be addressed; and in the rest of the concept nodes in FIG. 4A, the non-largest/top attribute classifiers are excluded. After such processes, the ARCL is obtained, as shown in FIG. 4B. Generally, the largest/top concept node for a certain attribute classifier is the concept node corresponding to the "Attribute Concept" of the certain attribute classifier. The largest/top concept node for a certain attribute classifier includes a largest/top set of information objects corresponding to the certain attribute classifiers.

The following steps are one of general processes to find the Attribute Concept and the corresponding largest/top concept node for every attribute classifier.

(1) Obtain ({m}', {m}"); wherein {m}' means the related information objects corresponding to attribute classifier m, and {m}" means the related attribute classifiers corresponding to {m}'.

(2) Compare ({m}', {m}") with the concept nodes included in a concept lattice to find the only one with exactly the same information objects and attribute classifiers, which is the largest/top concept node for attribute classifier m. As long as the target concept node is found, the comparison process may be terminated.

For example, for attribute classifier "i", referring to Table 2, μ(i) is obtained as follows:

μ(i)=({I,II,III,IV,V,VI,VIII,X,XI,XIII}, {e,i})

And then compare with the concept nodes C0, C1, C2, C3, C4, C5, C6, C7, C8, C9, C10, C11, C12, C13, C14, C15, C16, C17 and C18. We can find concept node C4 has the same information objects "I, II, III, IV, V, VI, VIII, X, XI, XIII" and attribute classifiers "e, i". Namely, concept node C4 is the largest/top concept node for attribute classifier "i" (corresponding to its Attribute Concept). As long as C4 is found, the comparison process may be terminated; not all the concept nodes need to be compared.

Repeat the steps above, we can find the largest/top concept nodes for the rest of attribute classifiers (a, b, c, d, e, f, g, h, j, k, l, m, n, o) as follows:

Largest/top concept node for Attribute classifier "a": Concept node C8;
Largest/top concept node for Attribute classifier "b": Concept node C13;
Largest/top concept node for Attribute classifier "c": Concept node C13;
Largest/top concept node for Attribute classifier "d": Concept node C2;
Largest/top concept node for Attribute classifier "e": Concept node C0;
Largest/top concept node for Attribute classifier "f": Concept node C7;
Largest/top concept node for Attribute classifier "g": Concept node C5;
Largest/top concept node for Attribute classifier "h": Concept node C6;
Largest/top concept node for Attribute classifier "i": Concept node C4;
Largest/top concept node for Attribute classifier "j": Concept node C3;
Largest/top concept node for Attribute classifier "k": Concept node C18;
Largest/top concept node for Attribute classifier "l": Concept node C1;
Largest/top concept node for Attribute classifier "m": Concept node C2;
Largest/top concept node for Attribute classifier "n": Concept node C1;
Largest/top concept node for Attribute classifier "o": Concept node C1.

Next, reserve every attribute classifier in its largest/top concept node and erase the rest of attribute classifiers that are not involved in their largest/top concept nodes. Accordingly, the ARCL shown in FIG. 4B is obtained. Such ARCL architecture will be used as a basis for the system and method to provide dynamical reclassifying hints through DRH procedure 123. Also in ARCL, each of the attribute classifiers exists at only the corresponding largest/top concept node. In FIG. 4B, we can see attribute classifiers "l, n, o" are located at the same Concept node C1; also attribute classifiers "d, m" are located at the same Concept node C2; and attribute classifiers "b, c" are located at the same Concept node C13. For those attribute classifiers located at the same concept node in ARCL, those attribute classifiers correspond to exactly the same ones of information objects. Namely, if the user inputs or selects either attribute classifiers "l, n, o", the search results will be the same information objects "V, X".

Table 2 and FIG. 4A illustrate a good case for an example format context. In another embodiment, which might be similar to most of actual situations occurring on a general computer system, some of stored information objects may not assigned with any attribute classifier yet. Namely, there is some information object(s) with no connection(s) to any attribute classifier; or there is attribute classifier(s) with no connection(s) to any information object. In such situations, a formal context (or a concept lattice) includes one or more concept node that has an empty set of information objects or attribute classifiers. Such empty set(s) is possible to cause mistakes in the sequent processes. Therefore, the method for dynamically reclassifying and retrieving target information object may include: (A) excluding an isolated information object without any connection to attribute classifiers; and/or (B) excluding an isolated attribute classifier without any connection to information objects. Steps (A) and (B) may be performed at the same time or start with either one. Alternatively, in another embodiment, the information object may be defined to have at least a connection with at least an attribute classifier; and/or the attribute classifier may be defined to have at least a connection with at least an information object.

Figure 3A:
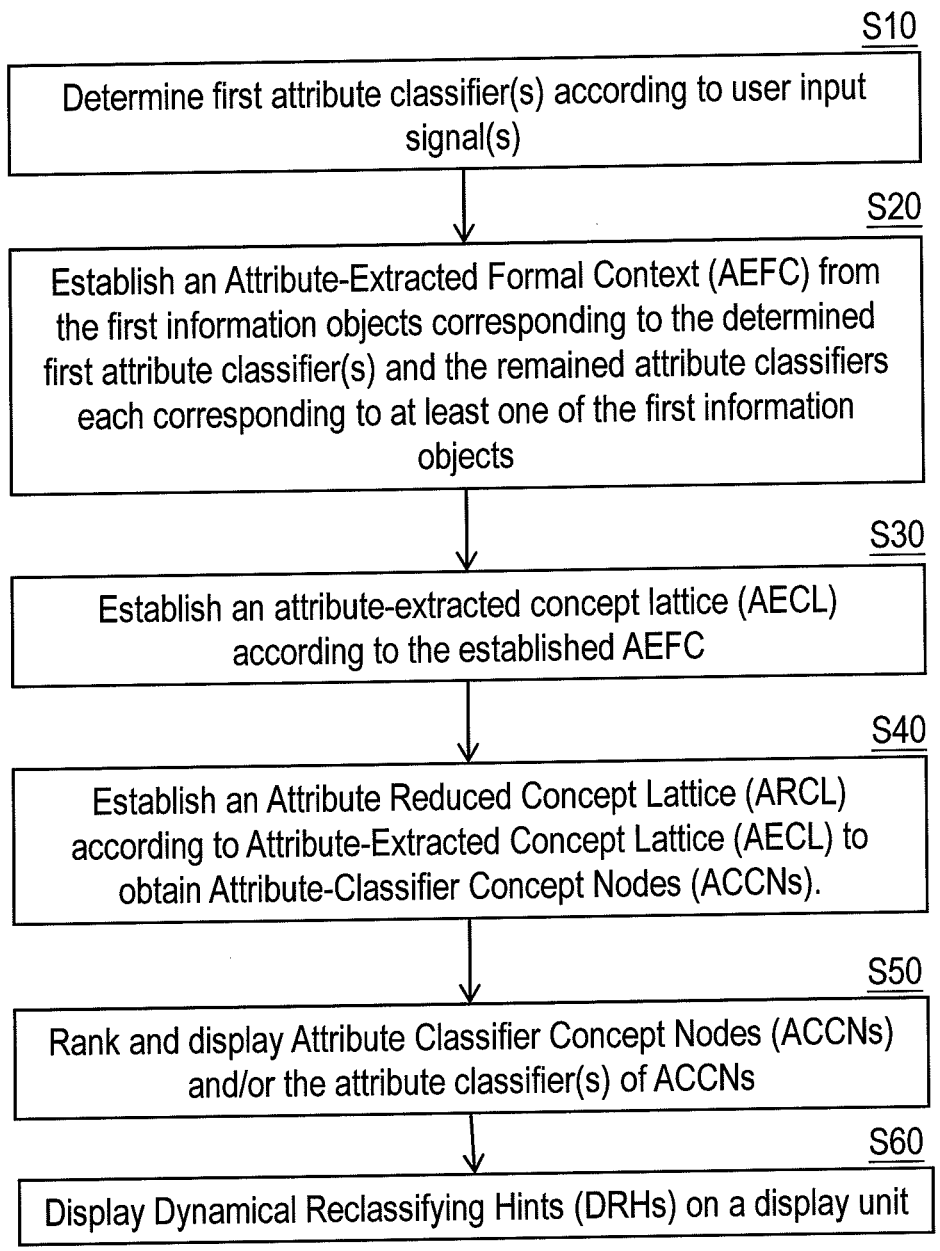
FIG. 3A is a flow chart of a method for dynamically reclassifying and retrieving target information object according to another embodiment.
Figure 3B:
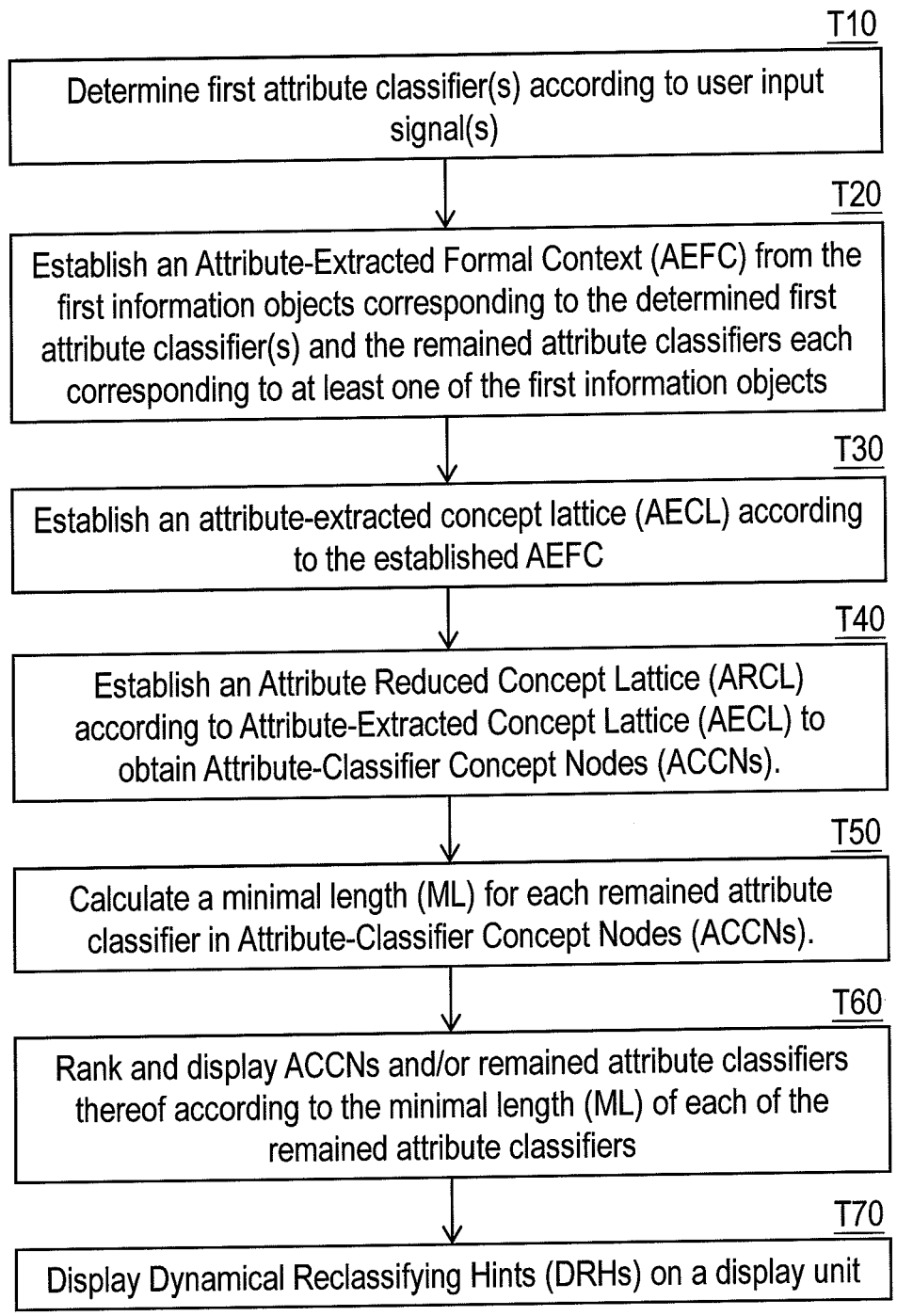
FIG. 3B is another flow chart of another method for dynamically reclassifying and retrieving target information object according to another embodiment.

Regarding to the operations of system 100 for dynamically reclassifying and retrieving target information object, please refer to FIG. 3A and FIG. 3B. FIG. 3A is a flow chart of a method for dynamically reclassifying and retrieving target information object according to another embodiment. FIG. 3B is another flow chart of another method for dynamically reclassifying and retrieving target information object according to another embodiment. Although the following sections of these methods are introduced in the form of steps and flow charts, the sections of these methods should not be limited to a certain sequence.

Please refer to FIG. 3A. Step S10: Determine first attribute classifier(s) according to user input signal(s). When system 100 is performing a search task initiated by a user, with or without collaborations of FCA procedure 122, DRH procedure 123 may be performed by the central processing unit 110 and memory 120 in advance to display an "interface window" with "dynamical reclassifying hints". Namely, a method for dynamically reclassifying and retrieving target information object according to another embodiment may further include: "displaying an interface window with dynamical reclassifying hint(s) on the display unit according to the user input signal(s)".

At such stage, the dynamical reclassifying hint(s) may include providing a search column for the user to input keywords, or an interactive list of the available attribute classifiers of information objects 124. When the user is inputting yet not finishing typing keyword(s), multiple "relevant keywords" (which may be any keywords regarding to the attribute classifiers or information objects) may be provided and displayed (ex. a dropdown list at the search column) for the user. Another event to trigger the DRHs is moving a cursor onto some remained attribute classifier(s) on the display unit 130, which is also defined as a user input signal or a temporary user selection. In short, a user input signal means, that the user may input commands (through input unit 140) in different ways to select first attribute classifier(s) through different displayed dynamical reclassifying hint(s), such as inputting search keywords/inquiries in the search column, selecting listed attribute classifier(s) or simply moving a cursor onto some attribute classifier(s) on the display unit 130. Since a still cursor does not really select anything, moving a cursor onto some attribute classifier(s) may be defined as a temporary user selection.

Afterwards, the accompanying user input signals are generated by the input unit 140, so system 100 is able to determine "first attribute classifier(s)" (initially determined attribute classifiers) that match the input search keywords or the selected attribute classifiers respectively. Certain search engine (search procedures for information objects) may be installed in memory 120 to facilitate the determining process of matching the correct attribute classifiers with the input keywords. Certainly, aside from text type attribute classifiers, the input/uploaded items or selected attribute classifiers may be digital audio files, certain digital colors (displayable on the screen of an electronic device), or digital pictures/photos/images/videos. If an image file is uploaded through the interface window, an image-based search engine is required for the system 100 to determine the first attribute classifier(s).

Step S20: Establish an Attribute-Extracted Formal Context (AEFC) from the first information objects corresponding to the determined first attribute classifier(s) and the remained attribute classifiers each corresponding to at least one of the first information objects(s).

In some embodiments, the determined first attribute classifier(s) and unrelated information objects may be excluded from AEFC. For example, if attribute classifier "e" and attribute classifier "i" is determined in Step S10, an "Attribute-Extracted Formal Context" will be formed as Table 3, in which attribute classifier "e" and attribute classifier "i" and unrelated information objects are excluded from this AEFC.

TABLE 3

|      | a | b | c | d | f | g | h | j | k | l | m | n | o |
|------|---|---|---|---|---|---|---|---|---|---|---|---|---|
| I    | * | * | * | * | * |   |   |   |   |   | * |   |   |
| II   | * |   |   |   |   |   |   |   |   |   |   |   |   |
| III  |   |   |   | * |   |   | * |   |   |   | * |   |   |
| IV   |   |   |   |   |   | * | * | * |   |   |   |   |   |
| V    | * | * | * | * | * | * | * | * | * | * | * | * | * |
| VI   |   |   |   |   |   | * | * |   |   |   |   |   |   |
| VIII | * |   |   | * |   |   |   |   |   |   |   |   |   |
| X    | * |   |   | * |   | * | * | * |   | * | * | * | * |
| XI   |   |   |   |   |   |   |   |   |   |   |   |   |   |
| XIII | * | * | * | * | * |   |   |   |   |   | * |   |   |

Referring to Table 3, when first attribute classifier "e" and attribute classifier "i" is determined in Step S10, central processing unit 110 performs DRH procedure 123 to establish the Attribute-Extracted Formal Context based on (1) the "first information objects" commonly corresponding to the first attribute classifier "e" and attribute classifier "i"; and (2) the remained attribute classifiers each corresponding to at least one of the first information objects respectively, with the determined first attribute classifiers "e" and "i" excluded. Namely, the DRH procedure 123 may include extracting all the common first information objects "I, II, III, IV, V, VI, VIII, X, XI, XIII" for both attribute classifier "e" and attribute classifier "i" first. Here the information objects "VII, IX, XII" are left behind and not included. Therefore, the remained attribute classifiers related to the first information objects "I, II, III, IV, V, VI, VIII, X, XI, XIII" would be attribute classifiers "a, b, c, d, f, g, h, j, k, l, m, n, o", excluding the determined first attribute classifiers "e" and "i". With or without collaborations of FCA procedure 122, DRH procedure 123 establishes the Attribute-Extracted Formal Context, as shown in Table 3. And comparing to the original formal context in Table 2, the Attribute-Extracted Formal Context in Table 3 includes only the first information objects corresponding to the determined attribute classifiers "e" and "i", as well as the remained attribute classifiers related to the first information objects, with the determined first attribute classifiers "e" and "i" and unrelated information objects VII, IX, XII excluded.

In Table 3, the information object XI has no relation with the remained attribute classifiers "a, b, c, d, f, g, h, j, k, l, m, n, o". In some embodiments mentioned above, such empty sets may cause failures or errors during FCA-related calculation processes. However, the information object XI needs not to be excluded since the information object XI substantially relates to attribute classifiers "e" and "i" and will not cause errors. Furthermore, if the determined first attribute classifiers are "e" and "i", the information object XI is exactly the perfect-match information object.

Although the embodiment above uses TWO determined attribute classifiers "e" and "i" as an example, the process of obtaining the Attribute-Extracted Formal Context (AEFC) according to ONE determined first attribute classifier is similar.

Figure 5A:
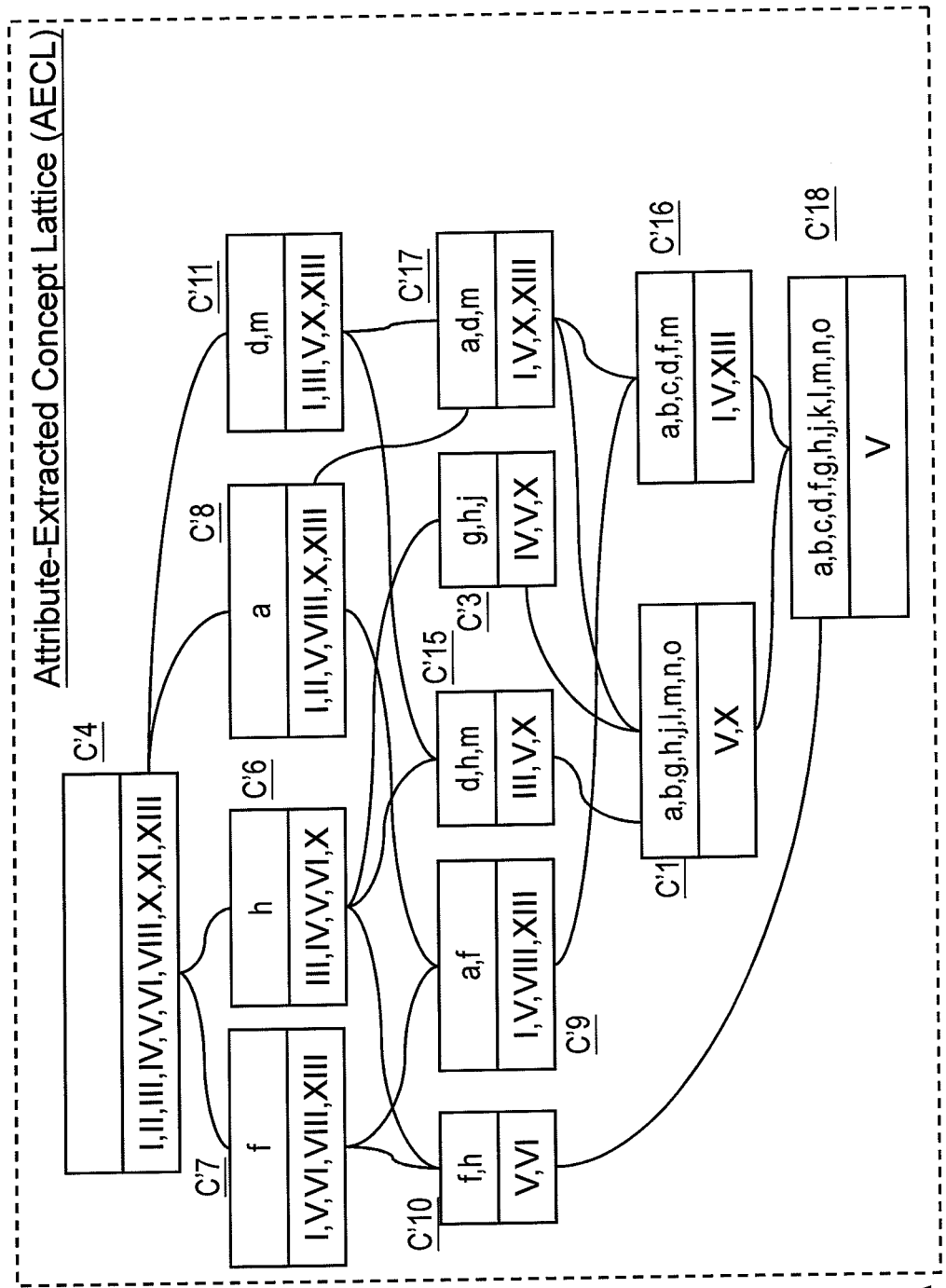
FIG. 5A is an explanatory diagram of an Attribute-Extracted Concept Lattice AECL based on Table 3 according to another embodiment.

Step S30: Establish an Attribute-Extracted Concept Lattice (AECL) according to the established Attribute-Extracted Formal Context (AEFC). With or without collaborations of FCA procedure 122, DRH procedure 123 establishes the Attribute-Extracted Concept Lattice AECL (FIG. 5A) based on the Attribute-Extracted Formal Context established in Step S20 and Table 3. In some embodiments, Step S30 is not always necessarily performed; FCA procedure 122 and/or DRH procedure 123 may perform relevant computing and calculation tasks in the background of system 100 without displaying any concept lattice, such as Attribute-Extracted Concept Lattice. The drawings and steps regarding different types of concept lattice according to various embodiments are for explanation purposes only.

Step S40: Establish an Attribute-Reduced Concept Lattice (ARCL) according to Attribute-Extracted Concept Lattice (AECL) to determine Attribute-Classifier Concept Nodes (ACCNs) corresponding to the remained attribute classifiers. With or without collaborations of FCA procedure 122, DRH procedure 123 establishes the Attribute-Reduced Concept Lattice ARCL and determines Attribute-Classifier Concept Nodes ACCNs (see the non-empty-set concept nodes in FIG. 5B) based on the Attribute-Extracted Concept Lattice AECL established in Step S30 and FIG. 5A. Please refer to FIG. 4B and the related descriptions to find out how the ARCL is obtained. In Table 3, attribute concepts for all the attribute classifiers "a, b, c, d, f, g, h, j, k, l, m, n, o" are used to determine the corresponding largest/top concept nodes for all the attribute classifiers:

Attribute classifier "a": concept node C'8;
Attribute classifier "b": concept node C'16;
Attribute classifier "c": concept node C'16;
Attribute classifier "d": concept node C'11;
Attribute classifier "f": concept node C'7;
Attribute classifier "g": concept node C'3;
Attribute classifier "h": concept node C'6;
Attribute classifier "j": concept node C'3;
Attribute classifier "k": concept node C'18;
Attribute classifier "l": concept node C'1;
Attribute classifier "m": concept node C'11;
Attribute classifier "n": concept node C'1;
Attribute classifier "o": concept node C'1.

Next, keep the attribute classifier in its largest/top concept node and erase the rest of attribute classifiers that are not involved in their largest/top concept nodes. In the Attribute- Reduced Concept Lattice (ARCL) of FIG. 5B, Attribute-Classifier Concept Nodes are determined, including ACCN {a}, ACCN {b, c}, ACCN {d, m}, ACCN {f}, ACCN {g, j}, ACCN {h}, ACCN {k} and ACCN {l, n, o}. None of the ACCNs includes an empty set of attribute classifiers.

Every ACCN includes the following properties:

(1) For any combination of the attribute classifiers included in the same ACCN as a search inquiry, the search results (namely the corresponding information objects) are the same. Take ACCN {b, c} as an example. Please refer back to FIG. 4B.

Condition (i) when attribute classifier "b" is input as a search inquiry, the matched search results includes corresponding information objects "I","V","XII",XIII".

Condition (ii) when attribute classifier "c" is input as a search inquiry, the matched search results includes corresponding information objects "I","V","XII",XIII"; which is the same as Condition (i).

Condition (iii) when both attribute classifiers "b" and "c" is input as a search inquiry, the matched search results includes corresponding information objects "I","V","XII", XIII"; which is the same as Conditions (i) and (ii).

(2) According to the connections between ACCNs in ARCL, other correlative attribute classifiers involved at the connected superset ACCN(s) may be determined. The connected ACCNs commonly have a least a portion of certain information objects.

For example, in view of ACCN {b, c} (namely concept node C13) in FIG. 4B, other correlative attribute classifiers "e, d, m" involved at the connected superset ACCNs (concept nodes C0 and C2) of ACCN {b, c} may be determined by selecting or using any combination of attribute classifiers "b" and "c" as a search inquiry. That is because in view of information objects, concept nodes C0 and C2 are the supersets of concept node C13; which means the information objects "I", "V", "XII", "XIII" of concept node C13 are all included in the information objects "I", "III", "V", "X", "XII", "XIII" of concept node C2 and the information objects "I", "II", "III", "IV", "V", "VI", "VII", "VIII", "IX", "x", "XI", "XII", "XIII" of concept node C0. Therefore, if any combination of attribute classifiers "b" and "c" is used as a search inquiry, the obtained search result, namely information objects "I", "V", "XII", "XIII", are also corresponding to attribute classifiers "e, d, m". Please refer to Table 2 for further confirmation.

In view of another example ACCN {j} (namely concept node C3) in FIG. 4B, the supersets are concept nodes C6, C4, C5 and C0. That means attribute classifier "e", attribute classifier "i", attribute classifier "h" and attribute classifier "g" are determined when attribute classifier "j" is selected.

Figure 5B:
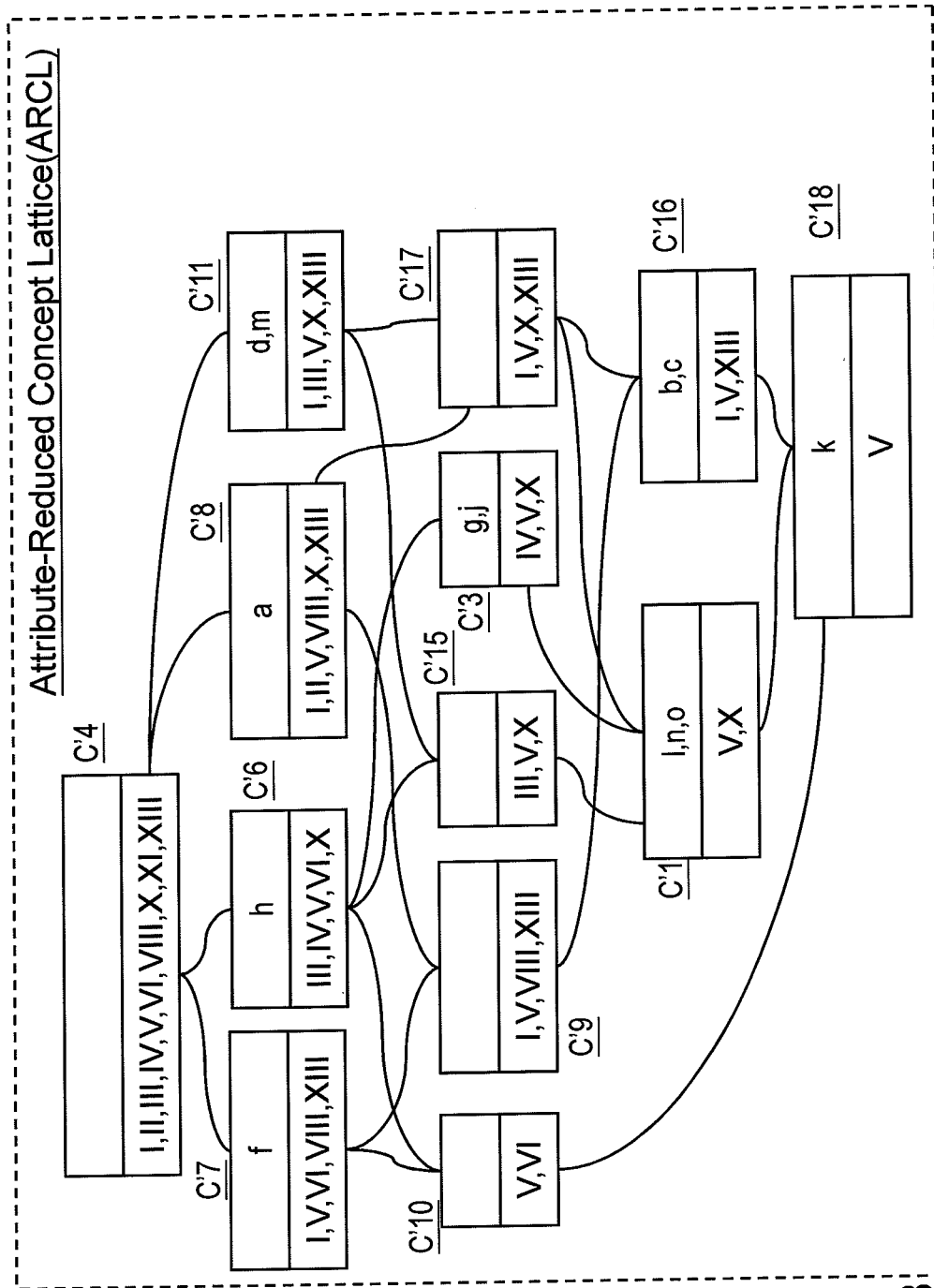
FIG. 5B is an explanatory diagram of another Attribute-Reduced Concept lattice ARCL based on the AECL in FIG. 5A according to another embodiment.

According to the relations between the attribute classifiers and information objects included in the formal context as shown in TABLE 3, when ACCN {b, c} is selected (such as the cursor is moved to attribute classifiers "b", "c" displayed on display unit 130), namely a corresponding user input signal is generated or a temporary user selection is made (namely upon a temporary user selection on the remained attribute classifiers b or c), we can find concept node C'16 is the corresponding ACCN in the Attribute-Reduced Concept Lattice (ARCL) of FIG. 5B. Since based on the property of a concept lattice according to Formal Concept Analysis, the information objects of concept node C'16 must also include the corresponding attribute classifiers in the connected concept nodes C'17, C'8, C'11, C'4, C'9 and C'7. Namely, if we use the possible combinations of attribute classifier b and attribute classifier c as the inquiry to address the target information object(s), the obtained information objects "I", "V", "XIII" must have the common attribute classifier "a" (C'8), attribute classifier "d, m" (C'11) and attribute classifier "f" (C'7).

In some embodiments, Step S40 is not always performed completely. FCA procedure 122 and DRH procedure 123 may perform relevant computing and calculation tasks in the background of system 100 without displaying any concept lattice, such as Attribute-Extracted Concept Lattice. The drawings and steps regarding different types of concept lattice according to various embodiments are for explanation purposes only.

Step S50: Rank and display Attribute-Classifier Concept Nodes (ACCNs) and/or the attribute classifier(s) of ACCNs. One of the ways to facilitate the following search process is to show the ACCNs (or simply the attribute classifier(s) of ACCNs) to the user, namely displaying on the display unit 130, such as ranked according to an alphabet sequence. So the user would be able to review the list of ACCNs (or their representing attribute classifiers), and see if the determined first attribute classifier(s) leads to the right search direction. If the determined first attribute classifier(s) is accurate enough, then maybe there will be ACCNs appropriate enough as the next choice. If the determined first attribute classifier(s) is not accurate, the use might find no right ACCNs or their attribute classifiers in the ranked ACCNs.

According to Steps S50 and the following Step S60, when ranked according to the alphabet sequence, the ACCNs or may be listed as follows and displayed on the display unit 130:

ACCN {a}
ACCN {b, c}
ACCN {d, m}
ACCN {f}
ACCN {g, j}
ACCN {h}
ACCN {k}
ACCN {l, n, o}

In some embodiments, only the attribute classifier(s) of ACCNs are representatively listed and displayed on the display unit 130, such as those attribute classifiers listed in the interface window 200 of FIGS. 6A-6E.

Step S60: Display Dynamical Reclassifying Hints (DRHs) on a display unit. Here DRH includes but not limited to the following enhanced computer-performable interfacing operations according to user input signals (user commands); these DRH-related operations may be directly displayed, or hidden and releasable in a dropdown list (see FIGS. 6B-6C and 6E), or according to a user input signal (such as moving a cursor to certain positions of interface window 200, like determined or remained attribute classifiers; see FIGS. 6B-6E), dynamically/interactively illustrated in the interface window 200 on the display unit 130. Here are further descriptions regarding to DRH-related operations:

i. "Common attribute classifiers": displaying attribute classifiers initially selected by the user, or determined according to a user input signal or temporary user selection, such as a user input inquiry (keyword; uploaded digital file), or an event with a cursor pointing certain attribute classifier(s). Relative examples:

(1) The attribute classifier groups 223 (with combined attribute classifiers "e, i") displayed in "Common attribute classifiers" section 221 of determined attribute area 220, as shown in FIGS. 6A-6E.

Figure 6B:
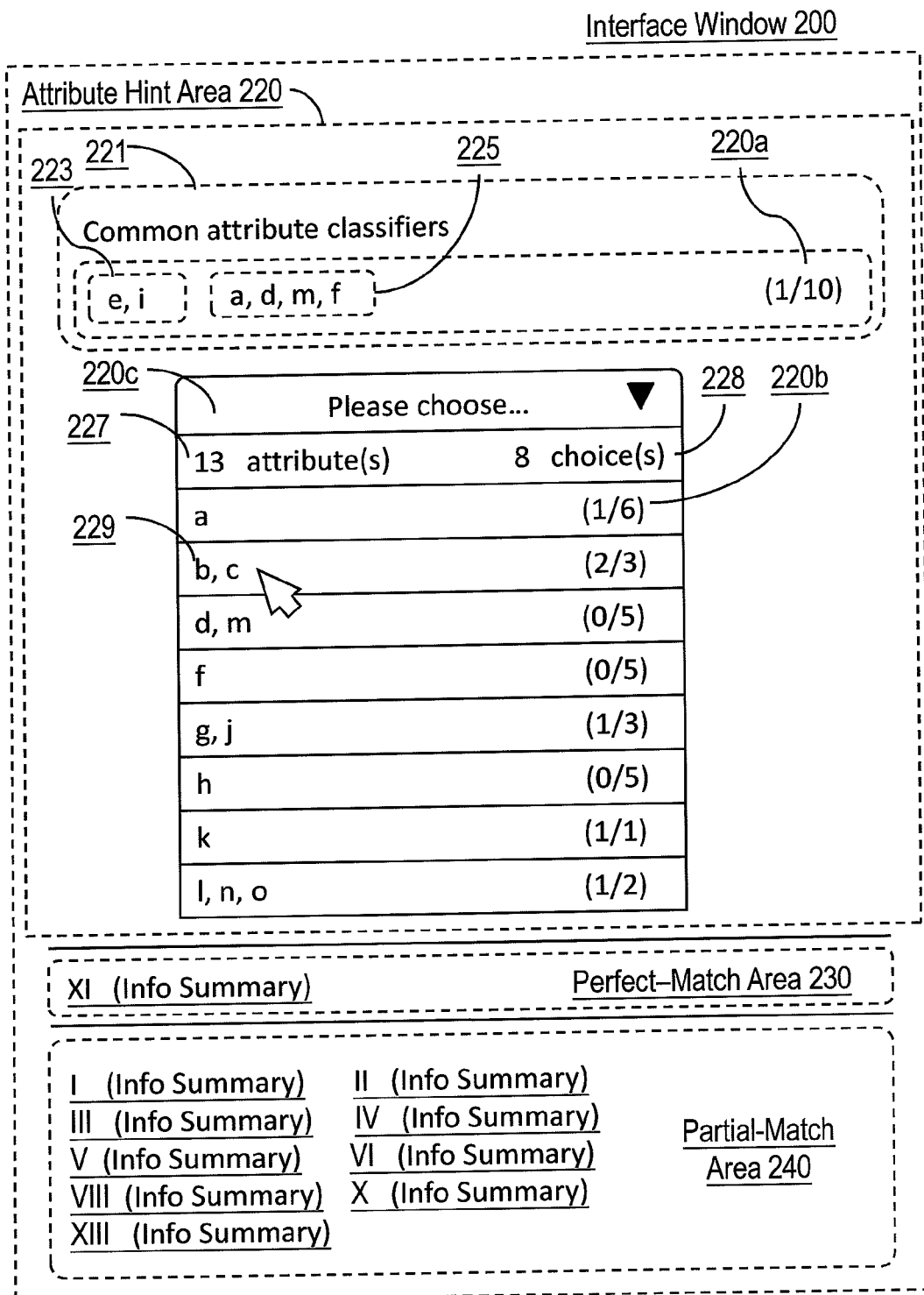
FIG. 6B is an explanatory diagram of at least a portion in another interface window displayed on a display unit according to another embodiment.
Figure 6C:
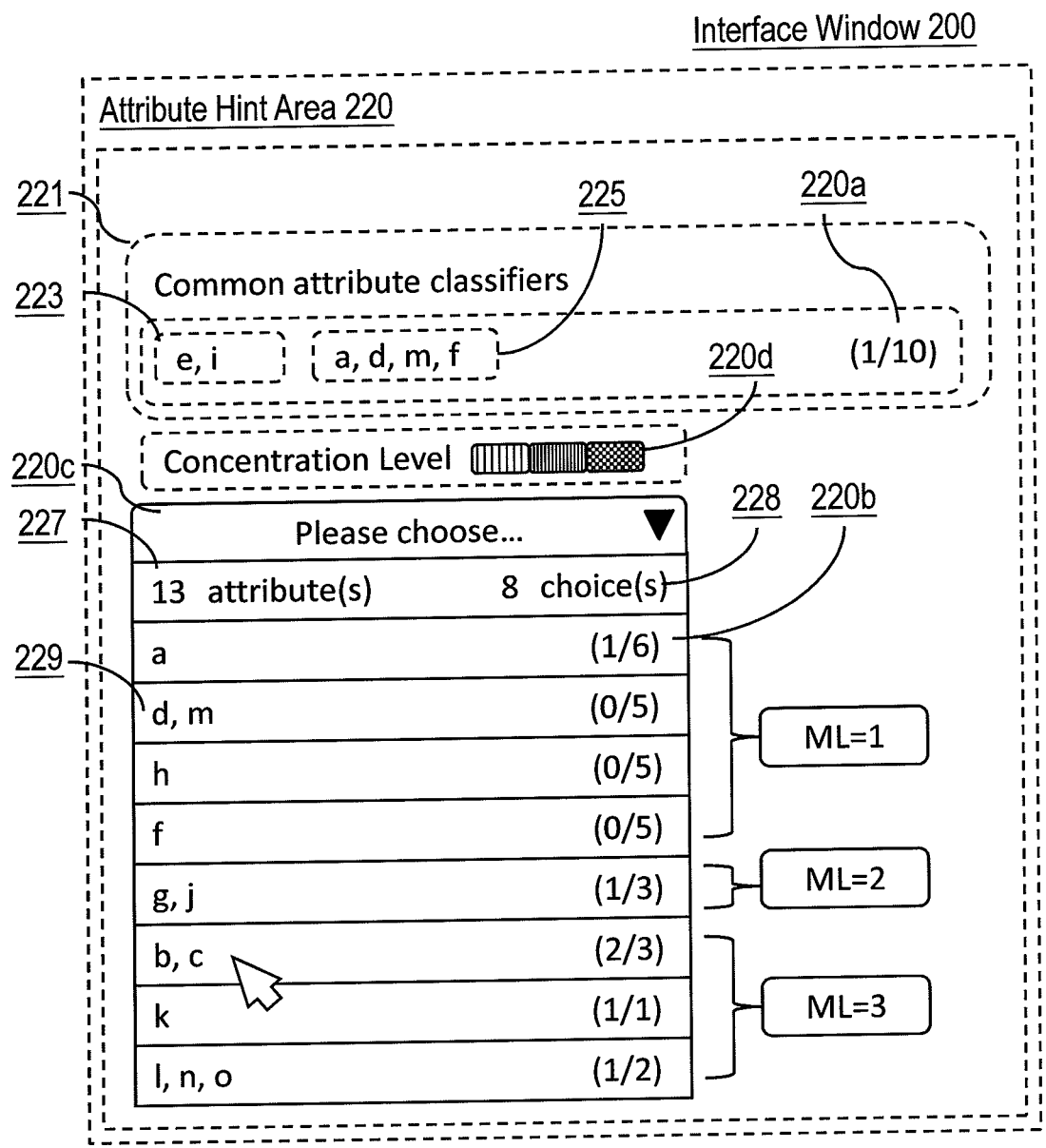
FIG. 6C is an explanatory diagram of at least a portion in another interface window displayed on a display unit according to another embodiment.
Figure 6D:
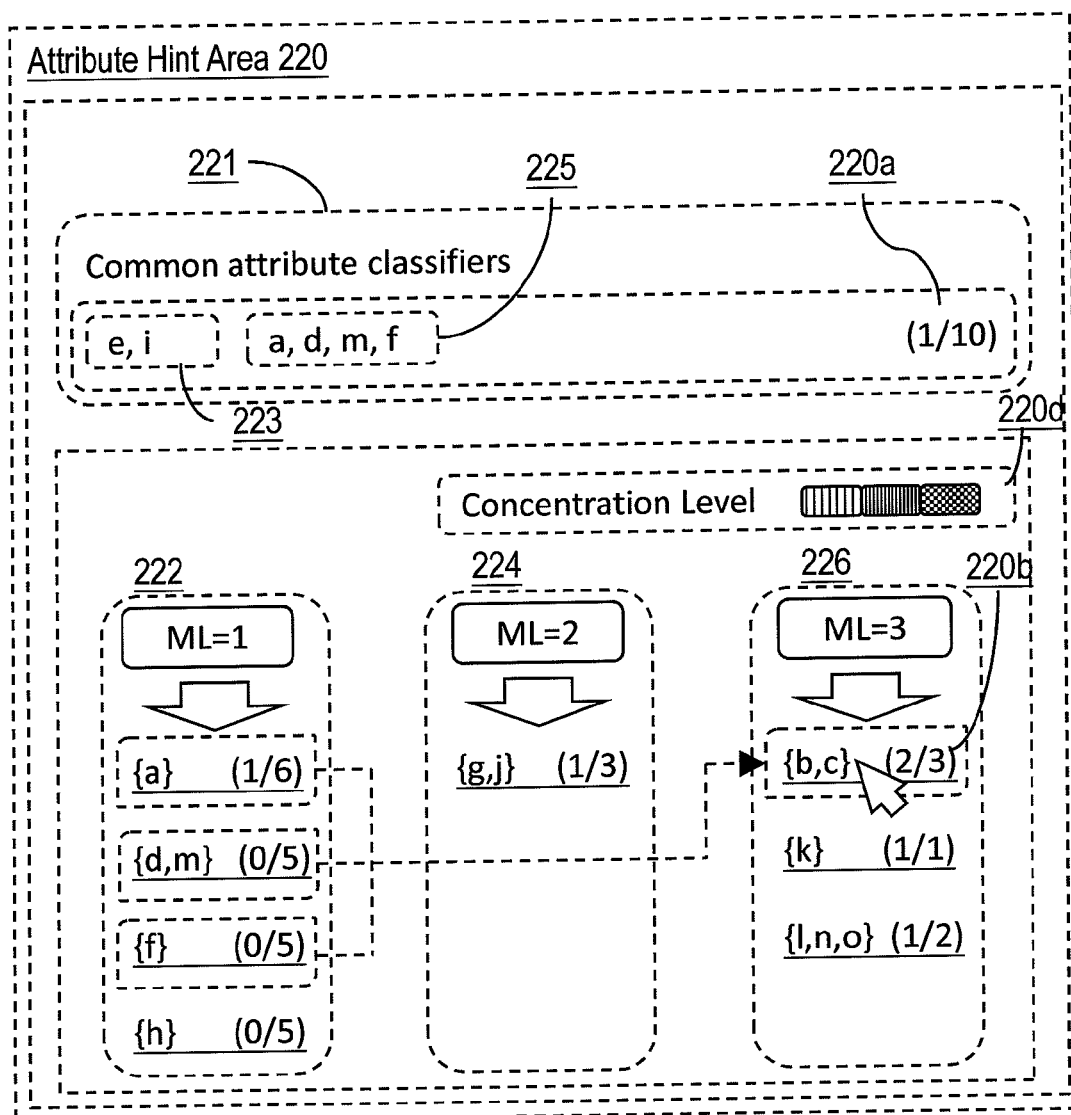
FIG. 6D is an explanatory diagram of at least a portion in another interface window displayed on a display unit according to another embodiment.
Figure 6E:
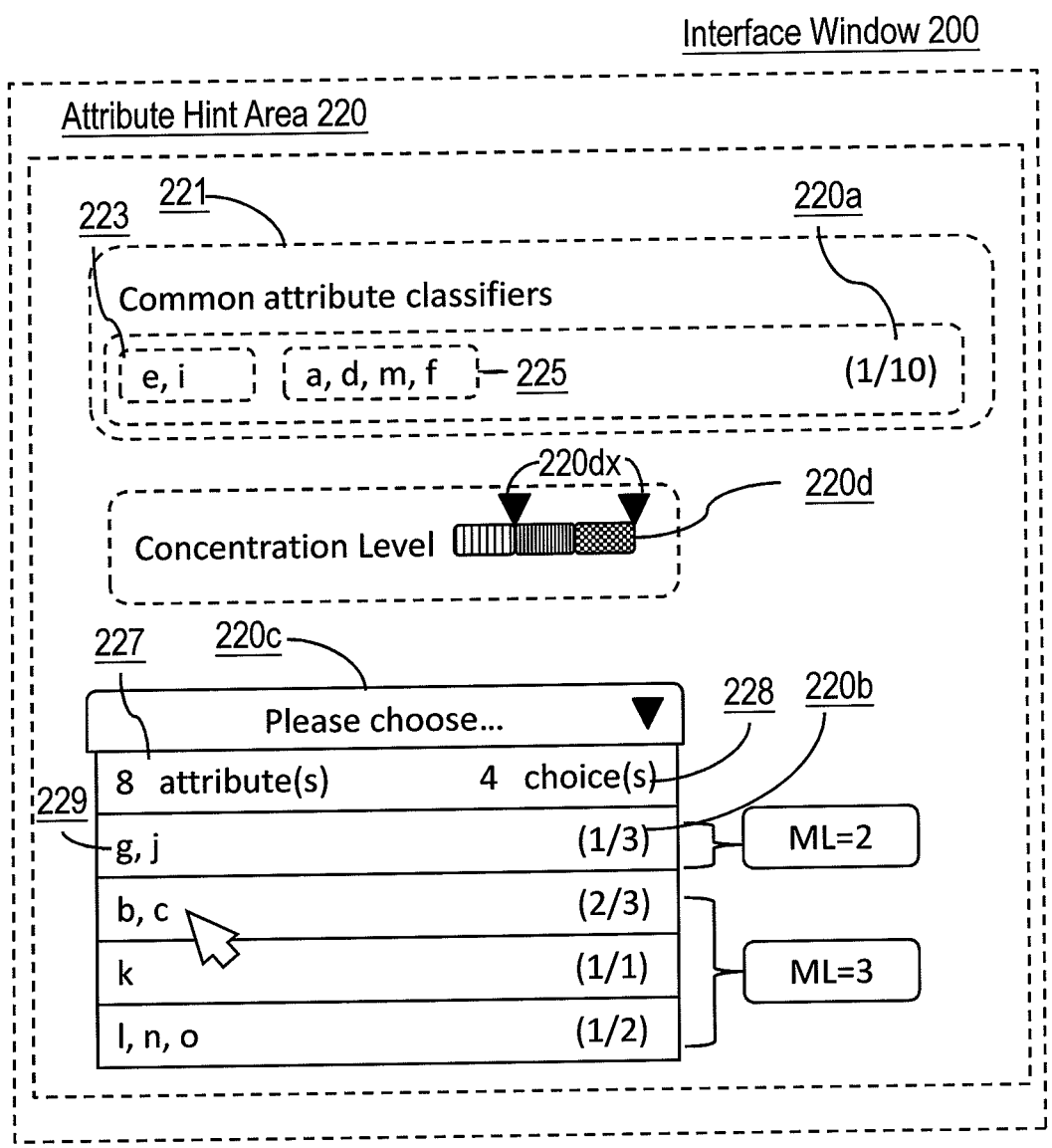
FIG. 6E is an explanatory diagram of at least a portion in another interface window displayed on a display unit according to another embodiment.

(2) Further-determined attribute classifier(s): When the cursor controlled by a mouse upon user's operation is moved to point at the remained attribute classifier(s)

within an ACCN list 220c (dropdown list), certain further determined, common attribute classifier(s) of certain information objects may be listed and displayed in "Common attribute classifiers" section 221 in the determined attribute area 220, such as attribute classifier groups 225 (with combined attribute classifiers "a, d, m, f") of FIGS. 6A-6E.

ii. Combined attribute classifiers: Attribute classifiers may be combined to reduce the remained attribute classifiers or to indicate the relation between some attribute classifiers. Examples include:

(1) If more than one attribute classifiers are included in an ACCN, the attribute classifiers of ACCNs will be displayed in a "combined form", such as the combined attribute classifiers {b, c}, {d, m}, {g, j} or {l, n, o} in the dropdown ACCN list 220c of attribute hint area 220 of interface window 200 in FIGS. 6B-6C and 6E. "Combine" means in any visible and computer-operable ways that indicate the in-between relations, such as having the same responses, or linking to the same hyperlinks. The "combined form" may be simply listed or grouped together, circled or marked, included in bracket or quotation marks, or neighbored and separated by punctuations like comma ",", slash "/", hyphen "-" and etc.

(2) If corresponding to at least a same group of certain information objects, certain attribute classifiers may be combined together as a displayable dynamical reclassifying hint, even though they are from different ACCNs. For example, as shown in FIGS. 6A-6E, attribute classifier groups 225 (with attribute classifiers "a, d, m, f") are combined. However, referring to FIG. 5B, attribute classifiers "a, d, m, f" are respectively from ACCN C'8, C'11 and C'7. It is because attribute classifiers "a, d, m, f" are from supersets of "b, c" and all includes the same information objects "I,V,XIII" of C'16 in FIG. 5B. Briefly, after the first attribute classifier(s) is determined (e.g. "e, i"), and second attribute classifier(s) (e.g. "b, c") among the remained attribute classifiers is "temporarily" determined according to at least a user input signal or a temporary user selection, multiple third attribute classifiers (e.g. "a, d, m, f") among the remained attribute classifiers are dynamically determined and visibly combinable with the second attribute classifier if the third attribute classifiers (e.g. "a, d, m, f") correspond to exactly at least the same one of the first information objects (e.g. "I,V,XIII" of C'16 in FIG. 5B) as the second attribute classifier(s) (e.g. "b, c"). Since attribute classifiers "a, d, m, f" are further determined and combined dynamically as a hint (a Dynamical Reclassifying Hint, DRH) if in FIGS. 6A-6E the user further selects the remained attribute classifiers "b, c", and such information is dynamically provided in advance to the user as DRHs on the display unit 130, the next step for the user will be easier to determine with those valuable information provided within DRHs. Certainly, in some embodiments, when the cursor is moved to point at the remained attribute classifiers "b, c", namely a user input signal is generated or a temporary user selection is made, then the remained attribute classifiers "a, d, m, f" are temporarily determined and may also be temporarily listed and displayed in the common attribute classifiers area 221.

In some embodiments, as long as the cursor is moved away from the attribute classifiers "b, c", accordingly the further determined attribute classifiers "a, d, m, f" may no longer needs to be displayed. Similarly, if in the beginning, "i" is selected as the first attribute classifier, since a second attribute classifier "e" is at the superset of "i" in FIG. 4B and must correspond at least the same information objects as "i" (the same information objects mean the same search results), the attribute classifiers "e, i" are combined as shown in FIG. 6A-6E. Certainly, "e" also corresponds to other information objects that "i" does not. When attribute classifier "i" is determined, those information objects that attribute classifier "i" does not correspond may be ignored when using an ACCN system. Technically "e" will be determined together with "i" because in the end both correspond to the same group of information objects as a search result.

iii. Amount(s) of perfect-match information objects and partial-match information objects: The determined first attribute classifier(s) helps to determine the amounts of perfect-match information objects and partial-match information objects, such as the numbers 220a shown in FIGS. 6A-6E.

iv. Amount(s) of the remained attribute classifiers: According to the determined first attribute classifier(s), the remained attribute classifiers will be determined, as well as the amount thereof. Refer to the number 227 shown in FIGS. 6B-6C, which indicates the amount of the remained attribute classifiers after the first attribute classifiers "e" and "i" are determined.

v. Amount(s) of available ACCNs: According to the determined first attribute classifier(s), ARCL and ACCNs thereof are further established. The amount of available ACCNs indicates the total numbers of choices that a user can have among the remained attribute classifiers and the corresponding ACCNs. Refer to the numbers 228 shown in FIGS. 6B-6C and 6E.

vi. Remained attribute classifiers: According to the determined first attribute classifier(s), the remained attribute classifiers will be determined and visibly displayed separately or combinatively with each other. Refer to attribute classifier 229 shown in FIGS. 6B-6C and 6E.

vii. Amounts of perfect-match information objects and partial-match information objects for the remained attribute classifiers: To provide further hints to the user for selecting the next one among the remained attribute classifiers, the amounts of perfect-match information objects and partial-match information objects for the remained attribute classifiers are visibly provided associated with the corresponding remained attribute classifiers. Refer to the numbers 220b shown in FIGS. 6A-6E.

In another embodiments, a method regarding "minimal length attribute concept" (see the flow chart in FIG. 3B) is applied to provide different types of DRH-related search results, such as those shown in interface windows 200 of FIGS. 6A, and 6C-6E.

Refer to FIGS. 3B, 5B, 6A and 6C-6D. Steps T10-T40 are similar to Steps S10-40 (see FIG. 3A).

Step T50: Calculate a minimal length (ML) for each remained attribute classifier in Attribute-Classifier Concept Nodes (ACCNs). The ACCNs obtained in Step T40 are corresponding to the concept nodes in FIG. 5B:

ACCN {a} is corresponding to concept node C'8;
ACCN {b, c} is corresponding to concept node C'16;
ACCN {d, m} is corresponding to concept node C'11;
ACCN {f} is corresponding to concept node C'7;
ACCN {g, j} is corresponding to concept node C'3;
ACCN {h} is corresponding to concept node C'6;
ACCN {k} is corresponding to concept node C'18;
ACCN {l, n, o} is corresponding to concept node C'1

Here "minimal length" (ML) for each ACCN is defined as the minimal path among all the paths in ARCL (see FIG. 5B) from the concept node to the "top concept node" in ARCL (ex. concept node C'4 of FIG. 5B). For example, to obtain the ML of ACCN {a}, referring to FIG. 5B, ACCN {a} corresponds to concept node C'8, and the top concept node is C'4. Therefore, there is only one path from concept node C'8 to C'4 and the path is 1, which means ML of ACCN {a} is 1. We can see ML is related to the number of connections between the ACCN to the top concept node in ARCL.

As to ACCN {b, c}, there are four paths from the corresponding concept node C'16 to the top concept node C'4:
C'16-C'9-C'7-C'4 (length=3);
C'16-C'9-C'8-C'4 (length=3);
C'16-C'17-C'8-C'4 (length=3);
C'16-C'17-C'11-C'4 (length=3).
Therefore, the ML of ACCN {b, c} is 3.

As to ACCN {l, n, o}, there are five paths from the corresponding concept node C'1 to the top concept node C'4:
C'1-C'15-C'6-C'4 (length=3);
C'1-C'15-C'11-C'4 (length=3);
C'1-C'3-C'6-C'4 (length=3);
C'1-C'17-C'8-C'4 (length=3);
C'1-C'17-C'11-C'4 (length=3).
Therefore, the ML of ACCN {l, n, o} is 3.

As to ACCN {k}, there are 11 paths from the corresponding concept node C'18 to the top concept node C'4:
C'18-C'1-C'15-C'6-C'4 (length=4);
C'18-C'1-C'15-C'11-C'4 (length=4);
C'18-C'1-C'3-C'6-C'4 (length=4);
C'18-C'1-C'17-C'8-C'4 (length=4);
C'18-C'1-C'17-C'11-C'4 (length=4);
C'18-C'16-C'9-C'7-C'4 (length=4);
C'18-C'16-C'9-C'8-C'4 (length=4);
C'18-C'16-C'17-C'8-C'4 (length=4);
C'18-C'16-C'17-C'11-C'4 (length=4);
C'18-C'10-C'7-C'4 (length=3);
C'18-C'10-C'6-C'4 (length=3).

Thus, the ML of ACCN {k} is 3 as well. ACCN {k} is an obvious case comparing to conventional lattice structure. In the conventional lattice structure, the bottom remained attribute classifier maybe need the user to search through more levels before reaching it. However, in this case, DRHs not only provide the displayable hint of ACCN {k}, which is at the bottom of ARCL, but also calculate the ML 3 for ACCN {k}.

Similarly, we can obtain all the MLs of the other ACCNs:
ACCN {a}: ML=1;
ACCN {b, c}: ML=3;
ACCN {d, m}: ML=1;
ACCN {f}: ML=1;
ACCN {g, j}: ML=2;
ACCN {h}: ML=1;
ACCN {k}: ML=3;
ACCN {l, n, o}: ML=3.

Step T60: Rank and display ACCNs and/or remained attribute classifiers thereof according to the minimal length (ML) of each of the remained attribute classifiers. We can rank the ACCNs according to minimal length (ML):
ML=1: ACCN {a}, ACCN {d, m}, ACCN {f}, ACCN {h}
ML=2: ACCN {g, j};
ML=3: ACCN {b, c}, ACCN {k}, ACCN {l, n, o}

Refer to FIGS. 6A and 6C-6E, the remained attribute classifiers are visually divided or indicated into groups according a minimal length within the ACCNs of each of the remained attribute classifiers. In FIGS. 6A and 6D, the remained attribute classifiers (indicating different ACCNs) are divided into groups 222/224/226; In FIG. 6C, the remained attribute classifiers are ranked according to the MLs (the less the higher) and the MLs are indicating at the right side of the listed remained attribute classifiers in a dropdown list. Either way helps the user to clear review the available search choices for his next user selections.

Step T70: Display Dynamical Reclassifying Hints (DRHs) on a display unit. Most of DRHs are mentioned above. Aside from indicating ML for user reference of further search choices, a special DRH called "Concentration Level" is introduced as the three indication columns 220d shown in FIGS. 6A, and 6C-6E.

After the first attribute classifiers are determined, the remained attribute classifiers regarding to ACCNs are listed in interface window 220. When the cursor is moving to one of ACCNs and/or the remained attribute classifiers (i.e. upon a temporary user selection on one or more remained attribute classifiers), such as "b, c", namely a user input signal is generated or a temporary user selection is made, the Concentration Level indicates the degree of "depth" or "concentration" for every remained attribute classifier. A high Concentration Level (three indication columns are full; see FIGS. 6A, and 6C-6E) means the pointed remained attribute classifier and the corresponding ACCN are located at the bottom section of ARCL; in other words, the ML of a remained attribute classifier with a high Concentration Level is higher. Also, such search choice directs to a narrower and more concentrated domain of information objects. For example, ACCN {b, c}, ACCN {k}, ACCN {l, n, o} all have a high Concentration Level and are all located at the bottom section of ARCL in FIG. 5B. We can see the available information objects are limited to I, V, X, XIII, a relatively small scope and amount.

Generally, the highest value (the amount of indication columns) for Concentration Level may be designated as the longest ML in the current stage. For example, ACCN {b, c}, ACCN {k}, ACCN {l, n, o} all have a longest ML=3 and their Concentration Level all reaches the highest value (all three indication columns are full). When the cursor is not pointing to any remained attribute classifiers, the Concentration Level may have a smallest value zero. In some embodiments, the Concentration Level may include different amount of total indication columns, more or less than three indication columns.

Please refer to FIG. 6E, which is an explanatory diagram of at least a portion in another interface window displayed on a display unit according to another embodiment. In FIG. 6E, one or more movable "range image(s)" 220dx are displayed along the three indication columns 220d of Concentration Level as a part of DRH in the attribute hint area 220 of interface window 200. Range images 220dx are adjustable icons (like the displayed two triangles) in any possible shapes. Adjust the range, scope, size or position of the range image may directly change the ranges of displayed attribute classifiers included in the dropdown ACCN list 220c. In FIG. 6E, the range images 220dx are set between the deeper concentration level (i.e. the darker two indication columns), so the attribute classifiers with ML=1 are omitted and only the attribute classifiers with ML=⅔ remain listed. Namely, the range image(s) adjusts the Concentration Level to change a certain scope of attribute classifiers (or their corresponding information objects) and hide the others, which help the user to narrow down or focus on the amount of attributes classifiers that the user intends to review.

Furthermore, please refer to FIG. 6A for another embodiment that applies the method and system mentioned above to system 100, as well as a user apparatus (not shown). The user apparatus is an information processing system in signal connection with system 100. The hardware structure of user apparatus may include a processor, a storage, a display unit and an input device (all not shown), similar to system 100. In some embodiment, system 100 may be realized by a remote web server while the user apparatus may be smartphones, PDAs, tablet or notebook computers, personal computers and etc. A web browser procedure may be installed on the user apparatus to access one or more interface windows 200 provided by system 100 and by the method for dynamically reclassifying and retrieving target information object. Namely system 100 in some cases may operate as a web server accessible through web protocols by a web browser.

In FIG. 6A~6E, an interface window 200 is provided by performing DRH procedure 123 and other related graphic procedures, which is shown on display unit 130 of system 100, or on a display unit of the external user apparatus. The interface window may be realized by a webpage format base on Hypertext Markup Language (HTML), eXtensible HyperText Markup Language (XHTML), Java Server Pages (JSP), Active Server Pages (ASP), PHP: Hypertext Preprocessor (PHP), Cascading Style Sheets (CSS), JavaScript, AJAX (Asynchronous JavaScript and XML) or any language which can build webpage. Certainly, when accessed on a local system 100, the interface window may be realized by application programs operable under operating systems environments. Furthermore, the user input signal in the embodiments of the disclosure may be generated by input unit 140 of the system 100, or by the input device of the external user apparatus. In other embodiments, input unit 140 of the system 100 or the input device of the external user apparatus may be respectively integrated with their display units, so as to facilitate on-screen input operations.

Interface window 200 basically includes multiple texts/images with hyperlinks, several information areas and one or more input column, all displayed within interface window 200 on display unit 130, or on a display unit of a user apparatus. Certainly, the major parts of interface window 200 are DRHs as mentioned in above embodiments. At the top of interface window 200, a keyword input column 210 is displayed with a "search" virtual button 212 at an adjacent position.

Certainly, after enter one or more search keyword and the determine attribute classifiers "e" and "i" are determined, DRH procedure 123 may display information summary of perfect-match information objects and/or partial-match information objects. In FIG. 6A, perfect-match area 230 has information summary of perfect-match information object "XI" displayed therein, since according to FIG. 6A and Table 3, information object "XI" corresponds to attribute classifier "e" and "i", exactly the same as the determined attribute classifier that is determined by the input search keywords. Partial-match area 240 has information summaries of partial-match information objects I, II, III, IV, V, VI, VIII, X, XIII displayed therein, since according to FIG. 6A and Table 3, information objects I, II, III, IV, V, VI, VIII, X, XIII all include other attribute classifier(s) other than "e" and "i".

In short, based on enhanced technology regarding Formal Concept Analysis, dynamical reclassifying hint(s) (DRHs) are dynamically provided to a user, based on the search inquiry input or a temporary user selection from the user to a computer system or electronic device. Unlike the traditional "tagged" information, the DRH(s) combined the attribute classifiers (or tags) with the same search results together, so as to eliminate possible repeated steps or processes that lead to the same search result(s), and also to reduce the remained selectable attribute classifiers and the following steps to retrieve the target information objects. Since the system and method still maintain the characteristics of tags for the attribute classifiers, no matter which attribute classifier is selected or determined as the first attribute classifier, DRH(s) is able to be provided dynamically and aimed to different first attribute classifier and next remained attribute classifiers determined by various search inquiries or user operations. Finally a user may increase the effectiveness and accuracy when trying to retrieve a target information object among massive information objects.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A system for dynamically reclassifying and retrieving at least a target information object among a plurality of information objects, comprising:
   a memory, storing the information objects and a plurality of attribute classifiers corresponding to the information objects, wherein each of the information objects has at least one of the attribute classifiers; and
   a central processing unit in signal connection with the memory, wherein after the central processing unit receives a determined first attribute classifier, the central processing unit determines a plurality of first information objects, wherein each of the first information objects has the determined first attribute classifier; the central processing unit removes the attribute classifiers which do not correspond to any of the first information objects, wherein the attribute classifiers not removed by the central processing unit comprise remained attribute classifiers each corresponding to at least one of the first information objects;
   wherein the remained attribute classifiers are visibly displayable through the system, the remained attribute classifiers are a part of a search result, at least two of the remained attribute classifiers which correspond to a same subset of the first information objects are combined by the central processing unit in a combined form to serve as a hint, and the system displays the hint, wherein the combined form of the remained attribute classifiers are simply listed, grouped, circled, or marked.

2. The system according to claim 1, wherein the remained attribute classifiers are ranked according to at least a sequence selected from a group consisting of an alphabet sequence, an overall-clicking ranking sequence, an overall-search ranking sequence, an ACCN (Attribute-Classifier Concept Node)-related sequence and any combination thereof.

3. The system according to claim 1, wherein an Attribute-Extracted Concept Lattice based on Formal Concept Analysis (FCA) is determined according to the first information objects and the remained attribute classifiers, thereby further determining the Attribute-Reduced Concept Lattice and Attribute-Classifier Concept Nodes with a top concept node for each of the remained attribute classifiers.

4. The system according to claim 1, wherein after receiving the determined first attribute classifier, according to at least a user input signal, the central processing unit determines at least a second attribute classifier among the remained attribute classifiers, which is visibly combinable with at least one of the remained attribute classifiers, when the first information objects which the second attribute classifier corresponds to are included in the first information objects which the combined one of the remained attribute classifiers corresponds to.

5. The system according to claim 1, wherein after receiving the determined first attribute classifier, the central processing unit determines a second attribute classifier among the remained attribute classifiers, which is visibly combinable with the determined first attribute classifier if the first information objects which the determined first attribute classifier corresponds to are included in the first information objects which the determined second attribute classifier corresponds to.

6. The system according to claim 1, wherein after the central processing unit receives the determined first attribute classifier, and a second attribute classifier among the remained attribute classifiers is temporarily determined according to at least a user input signal, a plurality of third attribute classifiers among the remained attribute classifiers are dynamically determined and visibly combinable together if the first information objects which the second attribute classifier corresponds to are included in the first information objects which the third attribute classifiers correspond to respectively.

7. The system according to claim 1, wherein the remained attribute classifiers are visually divided or indicated into a plurality of groups according to a minimal length within Attribute-Classifier Concept Nodes of each of the remained attribute classifiers.

8. The system according to claim 1, wherein a concentration level of the search result is visibly displayed upon a user selection of at least one of the remained attribute classifiers.

9. The system according to claim 8, wherein at least a range image is visibly movable to adjust the scope of the concentration level and the corresponding ones of the remained attribute classifiers.

10. The system according to claim 1, wherein an amount of partial-match of the first information objects for the determined first classifier and the remained attribute classifiers, and at least an information summary of partial-match of the first information objects for the determined first classifier and the remained attribute classifiers are determined according to a user input signal and are visibly output.

11. A method for dynamically reclassifying and retrieving at least a target information object among a plurality of information objects stored on a memory, a plurality of attribute classifiers corresponding to the information objects, wherein each of the information objects has at least one of the attribute classifiers, comprising:
receiving a determined first attribute classifier;
after receiving the determined first attribute classifier, a central processing unit determines a plurality of first information objects, wherein each of the first information objects has the determined first attribute classifier, and the central processing unit removes the attribute classifiers which do not correspond to any of the first information objects; in wherein the attribute classifiers not removed by the central processing unit comprise remained attribute classifiers each corresponding to at least one of the first information objects;
visibly displaying the remained attribute classifiers, and the remained attribute classifiers are a part of a search result;
when at least two of the remained attribute classifiers correspond to a same subset of the first information objects, combining the at least two of the remained attribute classifiers in a combined form to serve as a hint, wherein the combined form of the remained attribute classifiers are simply listed, grouped, circled, or marked; and
displaying the hint.

12. The method according to claim 11, wherein the remained attribute classifiers is are ranked according to at least a sequence selected from a group consisting of an alphabet sequence, an overall-clicking ranking sequence, an overall-search ranking sequence, an ACCN (Attribute-Classifier Concept Node)-related sequence and any combination thereof.

13. The method according to claim 11, wherein an Attribute-Extracted Concept Lattice based on Formal Concept Analysis (FCA) is determined according to the first information objects and the remained attribute classifiers, thereby further determining the Attribute-Reduced Concept Lattice and Attribute-Classifier Concept Nodes (ACCNs) with a top concept node for each of the remained attribute classifiers.

14. The method according to claim 11, wherein after receiving the determined first attribute classifier, according to at least a user input signal, the central processing unit determines at least a second attribute classifier among the remained attribute classifiers, the determined at least one second attribute classifier is combinable with at least one of the remained attribute classifiers visibly, when the first information objects which the second attribute classifier corresponds to are included in the first information objects which the combined one of the remained attribute classifiers corresponds to.

15. The method according to claim 11, wherein after receiving the determined first attribute classifier, the central processing unit determines a second attribute classifier among the remained attribute classifiers; the determined second attribute classifier is visibly combinable with the determined first attribute classifier if the first information objects which the determined first attribute classifier corresponds to are included in the first information objects which the determined second attribute classifier corresponds to.

16. The method according to claim 11, wherein after receiving the determined first attribute classifier, and a second attribute classifier among the remained attribute classifiers is temporarily determined according to at least a user input signal, a plurality of third attribute classifiers among the remained attribute classifiers are dynamically determined and visibly combinable together if the first information objects which the second attribute classifier corresponds to are included in the first information objects which the third attribute classifiers correspond to respectively.

17. The method according to claim 11, wherein the remained attribute classifiers are visually divided or indicated into a plurality of groups according to a minimal length within the Attribute-Classifier Concept Nodes (ACCNs) of each of the remained attribute classifiers.

18. The method according to claim 11, wherein a concentration level of the search result is visibly displayed upon a user selection of at least one of the remained attribute classifiers.

19. The method according to claim 18, wherein at least a range image is visibly movable to adjust the scope of the concentration level and the corresponding ones of the remained attribute classifiers.

20. The method according to claim 11, wherein an amount of partial-match of the first information objects for the determined first classifier and the remained attribute classifiers, and at least an information summary of partial-match of the first information objects for the determined first classifier and the remained attribute classifiers are determined according to a user input signal and are visibly output.

21. A user apparatus for dynamically reclassifying and retrieving at least a target information object among a plurality of information objects accessible through a system, the system being in signal connection with the user apparatus and being accessible to a plurality of attribute classifiers corresponding to the information objects, wherein each of the information objects has at least one of the attribute classifiers, the user apparatus comprising:
an input device, generating signals according to a user operation;
a processor in signal connection with the input device, outputting the signals to the system and receiving a determined first attribute classifier from the system; and
a display unit in signal connection with the processor, displaying the determined first attribute classifier from the system;
wherein according to the determined first attribute classifier, a plurality of first information objects, each of which has the determined first attribute classifier, are determined, and the attribute classifiers which do not correspond to any of the first information objects are removed, wherein the attribute classifiers not removed by the central processing unit comprise remained attribute classifiers each corresponding to at least one of the first information objects;
wherein the remained attribute classifiers are visibly displayed on the display unit through the system, the remained attribute classifiers are a part of a search result, when at least two of the remained attribute classifiers correspond to a same subset of the first information objects, the at least two of the remained attribute classifiers are combined by the processor in a combined form to serve as a hint, and the hint is visibly displayed on the display unit through the system, wherein the combined form of the remained attribute classifiers are simply listed, grouped, circled, or marked.

22. The system according to claim 21, wherein the remained attribute classifiers are ranked according to at least a sequence selected from a group consisting of an alphabet sequence, an overall-clicking ranking sequence, an overall-search ranking sequence, an ACCN-related sequence and any combination thereof.

23. The user apparatus according to claim 21, wherein an Attribute-Extracted Concept Lattice based on Formal Concept Analysis (FCA) is determined according to the first information objects and the remained attribute classifiers, thereby further determining the Attribute-Reduced Concept Lattice and Attribute-Classifier Concept Nodes (ACCNs) with a top concept node for each of the remained attribute classifiers.

24. The user apparatus according to claim 21, wherein after receiving the determined first attribute classifier, according to at least a user input signal the central processing unit determines at least a second attribute classifier among the remained attribute classifier, the determined at least one second attribute classifier is combinable with at least one of the remained attribute classifiers visibly on the display unit, when the first information objects which the second attribute classifier corresponds to are included in the first information objects which the combined one of the remained attribute classifiers corresponds to.

25. The user apparatus according to claim 21, wherein after receiving the determined first attribute classifier, the central processing unit determines a second attribute classifier among the remained attribute classifiers the determined second attribute classifier is visibly combinable with the determined first attribute classifier if the first information objects which the determined first attribute classifier corresponds to are included in the first information objects which the determined second attribute classifier corresponds to.

26. The user apparatus according to claim 21, wherein after receiving the determined first attribute classifier, and a second attribute classifier among the remained attribute classifiers is temporarily determined according to at least a user input signal, a plurality of third attribute classifiers among the remained attribute classifiers are dynamically determined and visibly combinable together if the first information objects which the second attribute classifier corresponds to are included in the first information objects which the third attribute classifiers correspond to respectively.

27. The user apparatus according to claim 21, wherein the remained attribute classifiers are visually divided or indicated into a plurality of groups according to a minimal length within the Attribute-Classifier Concept Nodes (ACCNs) of each of the remained attribute classifiers.

28. The user apparatus according to claim 21, wherein a concentration level of the search result is visibly displayed upon a user selection of at least one of the remained attribute classifiers.

29. The user apparatus according to claim 28, wherein at least a range image is visibly movable to adjust the scope of the concentration level and the corresponding ones of the remained attribute classifiers.

30. The user apparatus according to claim 21, wherein an amount of partial-match of the first information objects for the determined first classifier and the remained attribute classifiers, and at least an information summary of partial-match of the first information objects for the determined first classifier and the remained attribute classifiers are determined according to a user input signal and displayed on the displayed unit.

* * * * *